US009752711B2

(12) United States Patent
Knapp

(10) Patent No.: US 9,752,711 B2
(45) Date of Patent: Sep. 5, 2017

(54) PIPE COUPLING ASSEMBLY

(71) Applicant: SpringSeal, Inc., Streetsboro, OH (US)

(72) Inventor: Mark Knapp, Ravenna, OH (US)

(73) Assignee: Springseal, Inc., Streetsboro, OH (US)

( * ) Notice: Subject to any disclaimer, the term of this patent is extended or adjusted under 35 U.S.C. 154(b) by 333 days.

(21) Appl. No.: 14/249,608

(22) Filed: Apr. 10, 2014

(65) Prior Publication Data
US 2014/0217726 A1 Aug. 7, 2014

Related U.S. Application Data

(62) Division of application No. 12/471,576, filed on May 26, 2009, now Pat. No. 8,727,387.
(Continued)

(51) Int. Cl.
*F16L 21/02* (2006.01)
*F16L 17/025* (2006.01)
(Continued)

(52) U.S. Cl.
CPC ............. *F16L 17/025* (2013.01); *F16L 21/03* (2013.01); *F16L 25/0036* (2013.01);
(Continued)

(58) Field of Classification Search
USPC ....... 285/369, 372, 417, 373, 223, 235, 236, 285/110
See application file for complete search history.

(56) References Cited

U.S. PATENT DOCUMENTS 2,201,372 A  5/1940  Miller
2,230,725 A  2/1941  Nathan
(Continued)

FOREIGN PATENT DOCUMENTS

CA  1091719  12/1980
CH  643644  6/1984
(Continued)

OTHER PUBLICATIONS

Notification of Transmittal of Int. Preliminary Report on Patentability (7 pages) for Int.App. No. PCT/US06/017512 Int'l Search Report of EP Pat. App. No. 05853734.1 dated, Jan. 27, 2011, SpringSealm Inc.
(Continued)

*Primary Examiner* — Aaron Dunwoody
(74) *Attorney, Agent, or Firm* — Tarolli, Sundheim, Covell & Tummino LLP; John A. Yirga, Esq.

(57) ABSTRACT

A coupler assembly (10) and method of manufacture (10) for use with pipe comprising a unitary annular body (20) forming first and second cylindrical openings for surrounding a pipe or piping sections to facilitate forming a fluid-tight seal therein. The unitary annular body (20) comprises a medial portion (64) formed from a first material having a first durometer and first and second lateral portions (56, 58) integrally connected to opposite ends of the medial portion (64). The first and second lateral portions (56, 58) are made from a second material having a second durometer relatively higher than the first durometer of the first material. The coupler assembly (10) further comprises at least one clamping assembly (26) surrounding the unitary annular body member (20) adapted for compressing the coupler assembly (10) into a fluid-tight seal.

28 Claims, 15 Drawing Sheets

Related U.S. Application Data

(60) Provisional application No. 61/056,264, filed on May 27, 2008.

(51) Int. Cl.
  *F16L 21/03* (2006.01)
  *F16L 25/00* (2006.01)
  *F16L 25/12* (2006.01)
  *F16L 25/14* (2006.01)
  *F16L 27/108* (2006.01)
  *F16L 27/113* (2006.01)

(52) U.S. Cl.
  CPC ........... *F16L 25/0054* (2013.01); *F16L 25/12* (2013.01); *F16L 25/14* (2013.01); *F16L 27/1085* (2013.01); *F16L 27/1136* (2013.01); *F16L 2201/10* (2013.01)

(56) References Cited

U.S. PATENT DOCUMENTS

| | | |
|---|---|---|
| 2,259,940 A | 10/1941 | Nathan |
| 2,578,933 A | 12/1951 | Hunter et al. |
| 2,702,716 A * | 2/1955 | Basolo ............... F16L 21/022 24/278 |
| 2,953,398 A | 9/1960 | Haugen et al. |
| 3,031,200 A | 4/1962 | Hamer |
| 3,081,102 A | 3/1963 | Murray et al. |
| 3,118,682 A | 1/1964 | Fredd |
| 3,368,830 A | 2/1968 | French |
| 3,380,763 A | 4/1968 | Schmunk |
| 3,386,745 A | 6/1968 | Hein |
| 3,390,890 A | 7/1968 | Kurtz |
| 3,445,120 A | 5/1969 | Barr |
| 3,469,854 A | 9/1969 | Linwood |
| 3,695,639 A | 10/1972 | Shire et al. |
| 3,796,447 A | 3/1974 | de Putter |
| 3,813,107 A | 5/1974 | Ditcher |
| 3,856,315 A | 12/1974 | Stansbury |
| 3,861,721 A | 1/1975 | Berghofer |
| 3,865,386 A | 2/1975 | Wilke |
| 3,887,674 A | 6/1975 | Oostenbrink |
| 3,955,834 A | 5/1976 | Ahlrot |
| 4,018,461 A | 4/1977 | Bram |
| 4,036,513 A | 7/1977 | Loftus et al. |
| 4,059,293 A | 11/1977 | Sipler |
| 4,097,074 A | 6/1978 | Nagao et al. |
| 4,140,742 A | 2/1979 | Fischer |
| 4,141,576 A | 2/1979 | Lupke et al. |
| 4,173,362 A | 11/1979 | Glover et al. |
| 4,174,985 A | 11/1979 | Buidry |
| 4,188,040 A | 2/1980 | Wolf et al. |
| 4,223,895 A | 9/1980 | Roberts, Jr. et al. |
| 4,298,206 A | 11/1981 | Kojima |
| 4,333,662 A | 6/1982 | Jones |
| 4,365,818 A | 12/1982 | Tolliver |
| 4,371,179 A | 2/1983 | Bohman |
| 4,387,900 A | 6/1983 | Ditcher et al. |
| 4,394,024 A | 7/1983 | Delhaes |
| 4,395,159 A | 7/1983 | Karuks et al. |
| 4,487,421 A | 12/1984 | Housas et al. |
| 4,518,177 A | 5/1985 | Deakins |
| 4,538,837 A | 9/1985 | Cronk |
| 4,552,914 A | 11/1985 | Sterling |
| 4,564,220 A | 1/1986 | Sills et al. |
| 4,566,704 A | 1/1986 | van Dongeren |
| 4,575,128 A | 3/1986 | Sundquist |
| 4,585,026 A | 4/1986 | Norton |
| 4,602,792 A | 7/1986 | Andrick |
| 4,602,793 A | 7/1986 | Andrick |
| 4,630,848 A | 12/1986 | Twist et al. |
| 4,641,858 A | 2/1987 | Roux |
| 4,642,269 A | 2/1987 | Kohyama et al. |
| 4,702,502 A | 10/1987 | Shade et al. |
| 4,711,474 A | 12/1987 | Patrick |
| 4,743,422 A | 5/1988 | Kalris-Nielsen et al. |
| 4,772,154 A | 9/1988 | Caroulle |
| 4,795,166 A | 1/1989 | Irmler |
| 4,818,209 A | 4/1989 | Petersson et al. |
| 4,826,028 A | 5/1989 | Vassallo et al. |
| 4,834,398 A | 5/1989 | Guzowski et al. |
| 4,946,206 A | 8/1990 | Roe et al. |
| 4,969,653 A | 11/1990 | Breen |
| 5,013,052 A | 5/1991 | Butler et al. |
| 5,039,137 A | 8/1991 | Cankovic et al. |
| 5,045,635 A | 9/1991 | Kaplo et al. |
| 5,058,907 A | 10/1991 | Percebois et al. |
| 5,064,207 A | 11/1991 | Bengtsson |
| 5,067,751 A | 11/1991 | Walworth et al. |
| 5,106,129 A | 4/1992 | Camacho et al. |
| 5,114,162 A | 5/1992 | Ditcher |
| 5,143,381 A | 9/1992 | Temple |
| 5,163,717 A | 11/1992 | Wise |
| 5,163,718 A | 11/1992 | Cannon |
| 5,169,161 A | 12/1992 | Jones |
| 5,180,196 A | 1/1993 | Skinner |
| 5,288,087 A | 2/1994 | Bertoido |
| 5,324,083 A | 6/1994 | Vogelsang |
| 5,326,138 A | 7/1994 | Claes et al. |
| 5,346,662 A | 9/1994 | Black et al. |
| 5,360,851 A | 11/1994 | Feder et al. |
| 5,407,236 A | 4/1995 | Schwarz et al. |
| 5,415,436 A | 5/1995 | Claes et al. |
| 5,431,458 A | 7/1995 | Schaub et al. |
| 5,542,717 A | 8/1996 | Rea et al. |
| 5,566,955 A | 10/1996 | Preisendoerfer |
| 5,573,279 A | 11/1996 | Rea et al. |
| 5,577,741 A | 11/1996 | Sink |
| 5,603,532 A | 2/1997 | Guest |
| 5,626,349 A | 5/1997 | Sutherland et al. |
| 5,679,303 A | 10/1997 | Hayashi et al. |
| 5,687,976 A | 11/1997 | Andrick et al. |
| 5,722,702 A * | 3/1998 | Washburn ............... F16L 21/08 285/322 |
| 5,733,491 A | 3/1998 | Grosset et al. |
| 5,735,528 A | 4/1998 | Olsson |
| 5,806,593 A | 9/1998 | Surles |
| 5,813,705 A | 9/1998 | Dole |
| 5,973,061 A | 10/1999 | Feder et al. |
| 5,988,695 A | 11/1999 | Corbett, Jr. |
| 5,992,469 A | 11/1999 | Hegler |
| 5,996,635 A | 12/1999 | Hegler |
| 6,082,741 A | 7/2000 | Gregoire et al. |
| 6,126,173 A | 10/2000 | Westhoff et al. |
| 6,126,209 A | 10/2000 | Goddard |
| 6,170,883 B1 | 1/2001 | Mattsson et al. |
| 6,193,285 B1 | 2/2001 | Proctor |
| 6,237,966 B1 | 5/2001 | Kearns |
| 6,328,309 B1 | 12/2001 | Corbett, Jr. |
| 6,343,623 B2 | 2/2002 | Hegler |
| 6,359,073 B1 | 3/2002 | Babb et al. |
| 6,367,802 B1 | 4/2002 | Knapp |
| 6,458,301 B1 | 10/2002 | Hendrix |
| 6,476,141 B1 | 11/2002 | Chang et al. |
| 6,550,775 B2 | 4/2003 | Knapp |
| 6,620,369 B1 | 9/2003 | Mead |
| 6,726,219 B2 | 4/2004 | Bivens |
| 6,739,632 B1 | 5/2004 | Thomas et al. |
| 6,938,933 B2 | 9/2005 | Sarita |
| 7,207,606 B2 | 4/2007 | Owen et al. |
| 7,469,905 B2 | 12/2008 | Knapp |
| 2001/0052702 A1 | 12/2001 | Starita |
| 2001/0054820 A1 | 12/2001 | Starita |
| 2002/0074741 A1 | 6/2002 | Knapp |
| 2003/0020276 A1 | 1/2003 | Steele |
| 2004/0007875 A1 * | 1/2004 | Bishop ................ F16L 21/06 285/369 |
| 2004/0041347 A1 | 3/2004 | Beach et al. |
| 2004/0072949 A1 | 4/2004 | Ding et al. |
| 2004/0108722 A1 | 6/2004 | Starita |
| 2004/0113327 A1 | 6/2004 | Starita |
| 2004/0207201 A1 | 10/2004 | Starita |
| 2005/0099003 A1 | 5/2005 | Tarara |
| 2005/0167982 A1 | 8/2005 | Starita |

(56) References Cited

U.S. PATENT DOCUMENTS

| | | |
|---|---|---|
| 2006/0267343 A1 | 11/2006 | Wright |
| 2006/0279084 A1 | 12/2006 | Collins |
| 2007/0001456 A1 | 1/2007 | Diez et al. |
| 2007/0075544 A1 | 4/2007 | Duininck et al. |
| 2007/0290455 A1 | 12/2007 | Knapp et al. |
| 2009/0065968 A1 | 3/2009 | Knapp |

FOREIGN PATENT DOCUMENTS

| | | |
|---|---|---|
| CH | 643644 A5 | 6/1984 |
| DE | 3113320 A1 | 2/1982 |
| DE | 3728034 | 3/1989 |
| DE | 3826622 | 2/1990 |
| DE | 3909381 | 12/1990 |
| DE | 4003283 | 8/1991 |
| DE | 4207849 | 9/1993 |
| DE | 4241622 | 6/1994 |
| DE | 19628639 | 1/1998 |
| EP | 192597 A2 | 8/1986 |
| EP | 0311296 | 4/1989 |
| GB | 2218768 | 11/1989 |
| GB | 2331137 | 5/1999 |
| JP | 02113193 | 4/1990 |
| JP | 04277394 | 10/1992 |
| JP | 06109174 | 4/1994 |
| JP | 06109193 | 4/1994 |
| JP | 06221482 | 8/1994 |
| JP | 2620177 | 6/1997 |
| WO | WO 00/53695 | 9/2000 |

OTHER PUBLICATIONS

International Search Report and Written Opinion; Application No. PCT/US2009/045114, Mailed on Jul. 1, 2009, 11 pages.

One page advertisement entitled "No-Hub Couplings", print out from Fernco Inc. web site on Dec. 1, 2009. http://www.fernco.com/plumbing/shielded-couplings/no-hub-couplings.

Two page advertisement entitled "Cost-Effective Watertight Seals for Corrugated Pipe", print out from NPC, Inc. web site on Mar. 11, 2008. http://npc.com/products/pipe-connectors/pipe-adaptor.htm.

Two page advertisement showing "Watertyte Joint Design", print out from CPP Engineering, LLC web site on Mar. 11, 2008. http://www.cpp-engineering.com/WarertyteJointDesign.htm.

Notification of Transmittal of International Preliminary Report on Patentability (7 pages) for Int. Application No. PCT/US06/017512.

International Search Report on EP Pat. App. No. 058537341 dated Sep. 24, 1999 (25 pages).

* cited by examiner

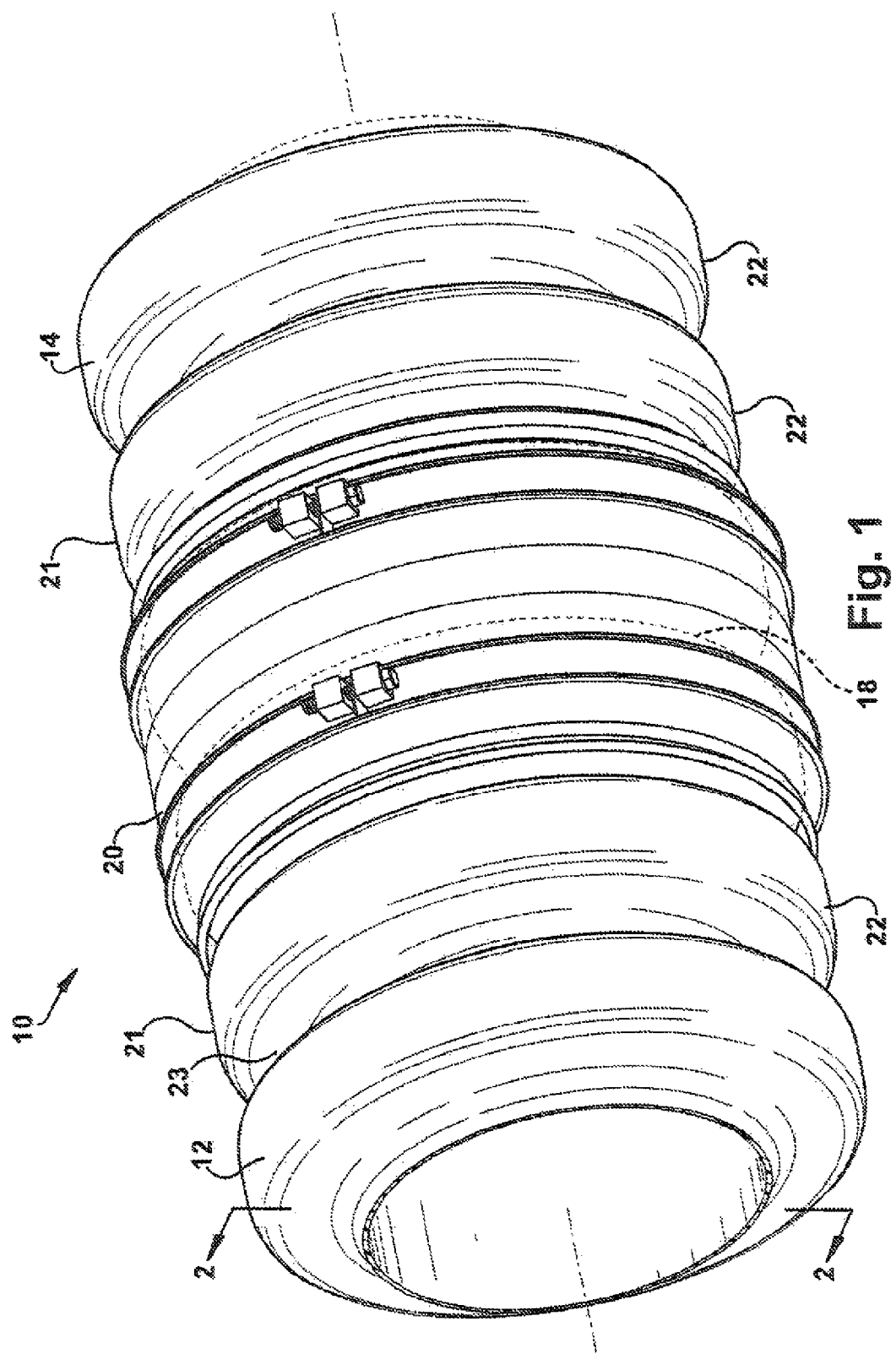

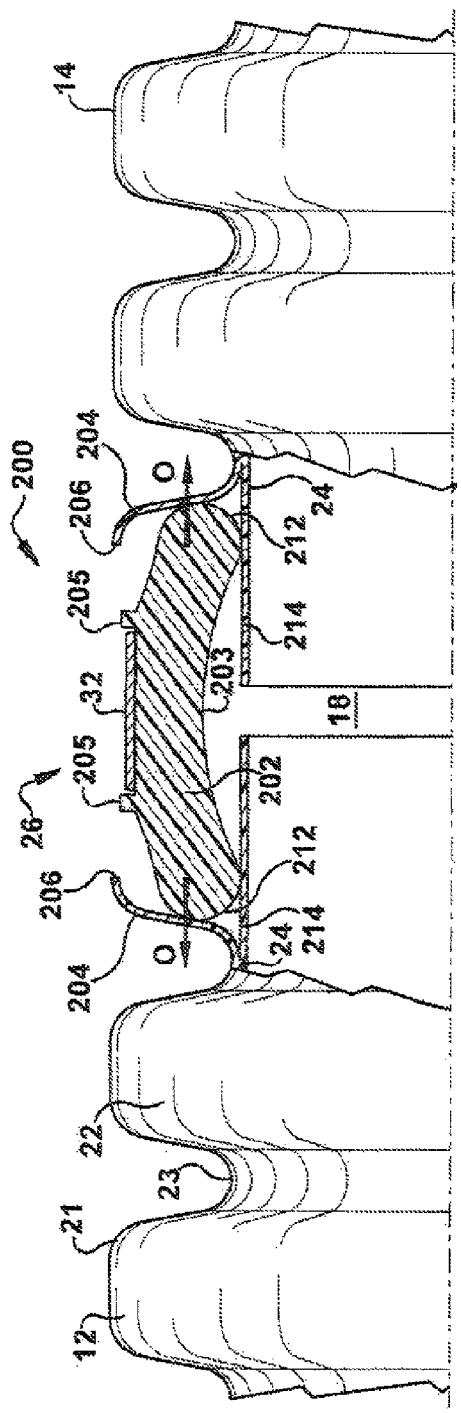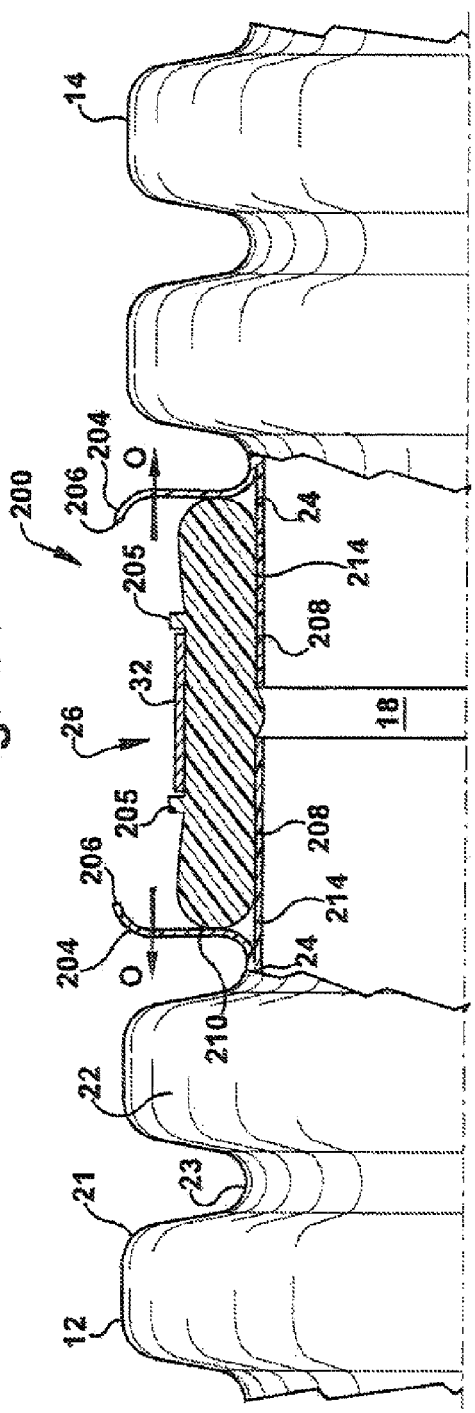
Fig. 4A
Fig. 4B

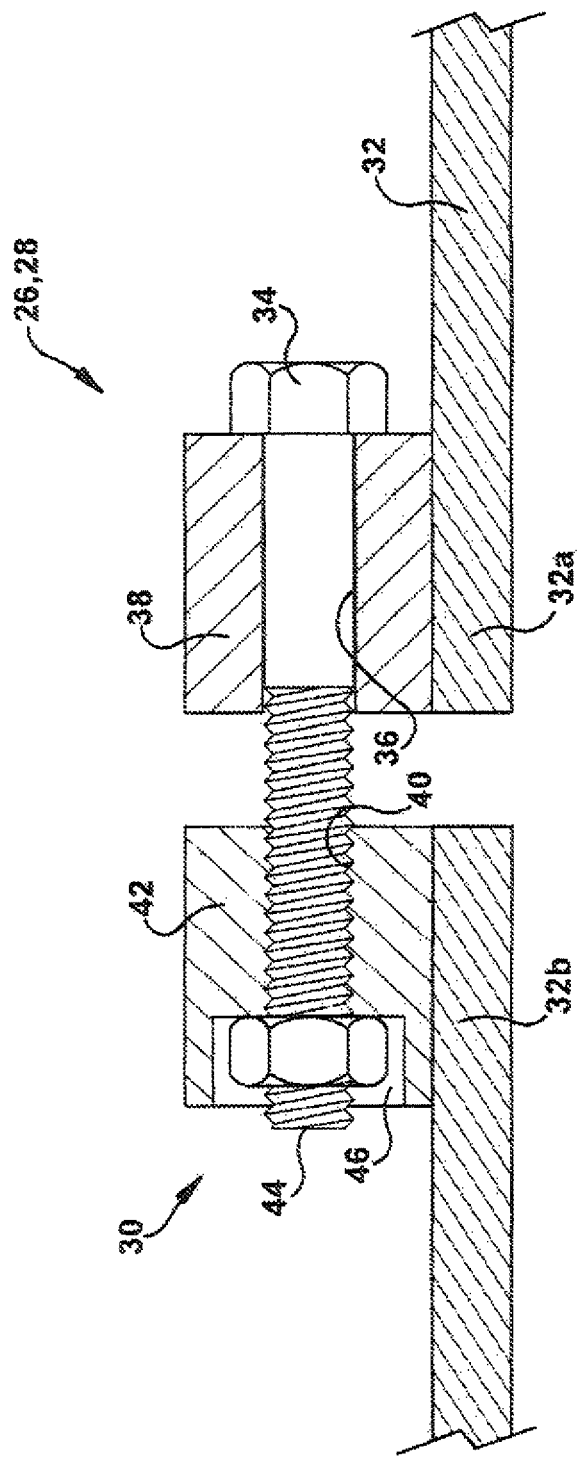

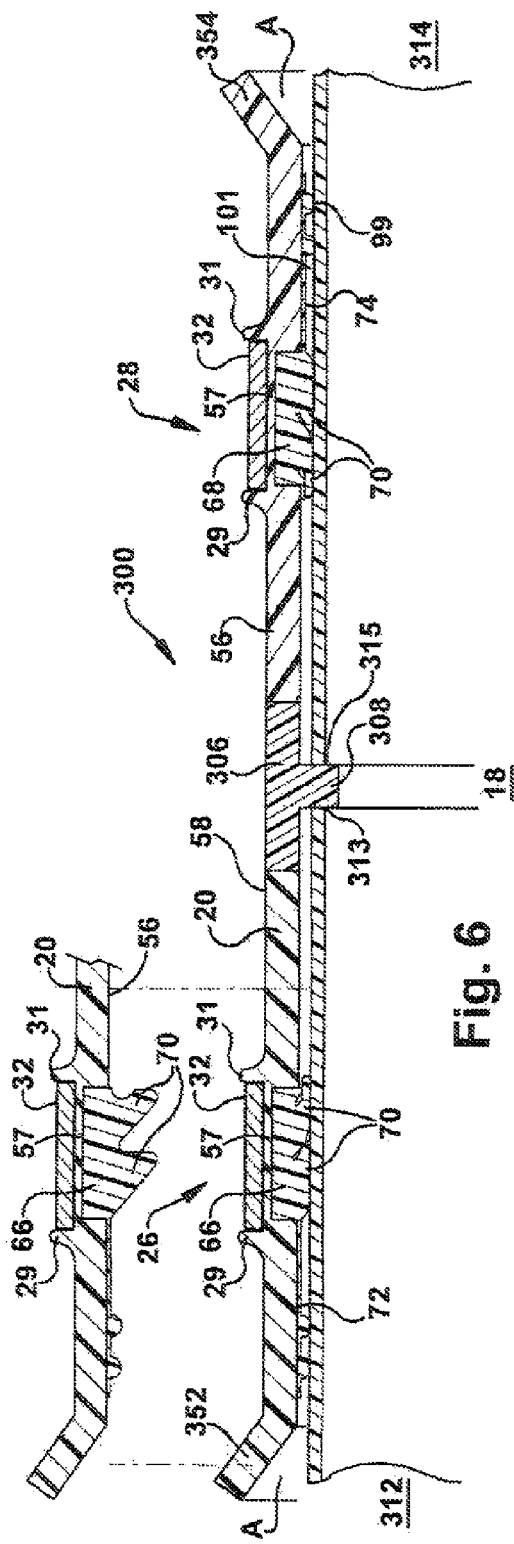
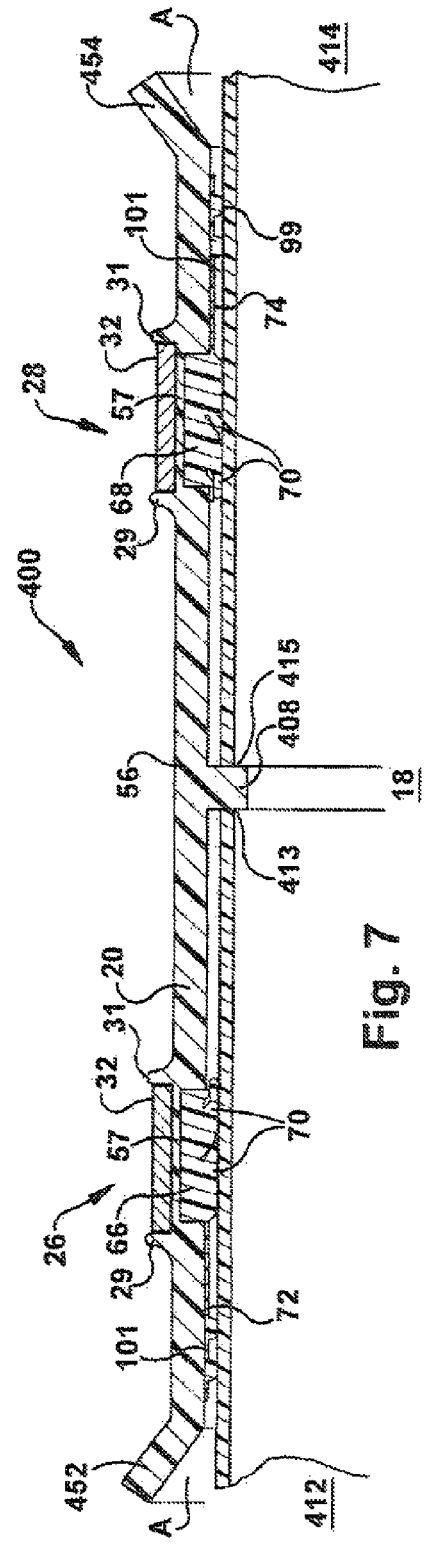
Fig. 6
Fig. 7

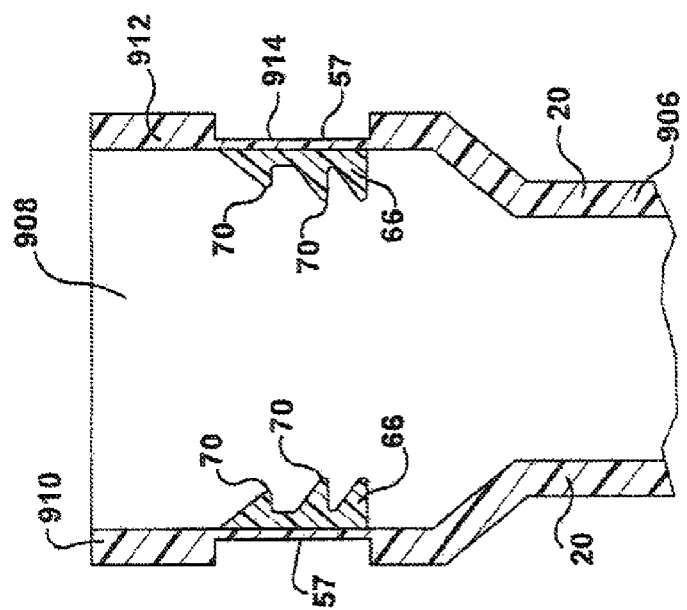
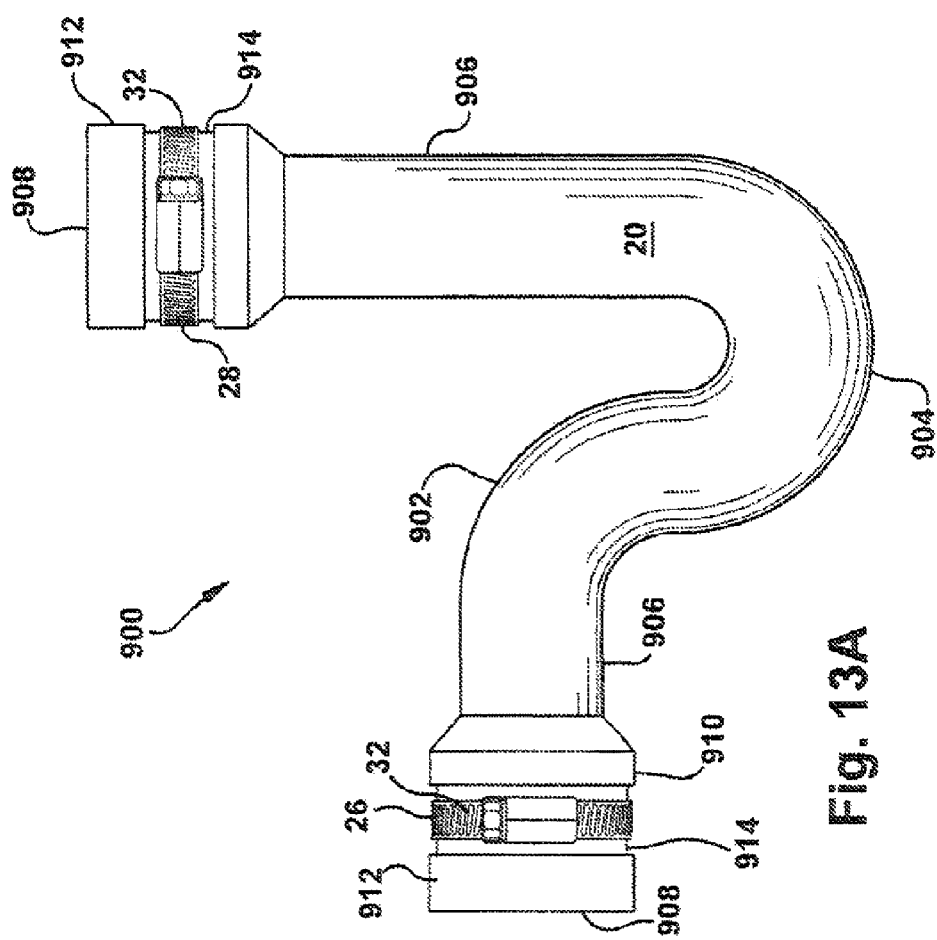

PIPE COUPLING ASSEMBLY

CROSS REFERENCES TO RELATED APPLICATIONS

The following application is a divisional application claiming priority to copending U.S. patent application Ser. No. 12/471,576 filed on May 26, 2009, which claims priority to U.S. Provisional Patent Application Ser. No. 61/056,264 filed May 27, 2008. This application incorporates the above-identified applications herein by reference in their entirety and claims priority therefrom for all purposes.

TECHNICAL FIELD

The present invention relates to a pipe coupling assembly for connecting two pieces of pipe or over an opening in a single pipe, and more specifically, a pipe coupling assembly providing a fluid-tight connection between two pieces of piping or over an opening in a single pipe.

BACKGROUND

It is desirable to form a fluid-tight seal between two pipe sections, including piping typically used for drainage, sanitary sewer applications, and water collecting on the surface and in the ground of agricultural, residential, and commercial properties. Historically, clay tile was used to achieve a desired drainage level. Clay tile is typically constructed in one or two foot sections and possesses many inherent deficiencies, such as, susceptibility to cracking, labor-intensive installation in placement of the sections in close proximity, and the significant amount of weight associated with each section.

The above deficiencies identified with clay tile are likely a cause for the more recent creation and popularity of using corrugated plastic piping (typically formed from polyethylene) for various drainage applications. The corrugations in the piping provide both strength and flexibility, allowing single continuous sections to extend in excess of one-hundred feet before connecting to a mating pipe section.

It is desirable to form a fluid-tight seal between the mating corrugated pipe sections. In order to form the mating connection, special geometrical construct is typically required at the ends of the pipe sections to be joined. The typical geometrical construction of the sections includes one of the two ends of the pipe having an end formation for insertion, typically referred to as a spigot. A pipe receiving end formation for receiving the spigot end of a pipe is typically, referred to as a bell is designed to have an inner diameter greater than the outer diameter of the spigot, such that the spigot is inserted into the bell to form the fluid-tight seal.

It is not uncommon to place an elastomeric gasket around the outer diameter of the spigot that contacts the inner diameter of the bell, providing the fluid tight sealing connection as discussed further in U.S. Pat. No. 7,469,905 that issued Dec. 30, 2008 entitled PERMANENTLY LUBRICATED FILM GASKET AND METHOD OF MANUFACTURE assigned to SpringSeal Inc. of Streetsboro, Ohio, which is incorporated in its entirety herein by reference for all purposes. Typically, a clamping device such as a hose clamp is positioned and secured over the bell between gasket and opening end of the bell to assist in forming the fluid-tight seal.

A large friction force is typically encountered when the spigot, having an elastomeric gasket is inserted into the bell. As the spigot is being inserted, the gasket is at times pulled from its position by the large frictional force. Additionally, the bell or outer pipe of the mating pipe sections has a tendency to deflect away from the elastomeric gasket during insertion. The deflected area of the outer pipe or bell is often disposed to leaks and is further weakened with its exposure to fluid and/or fluid pressure.

SUMMARY

One example embodiment of the present disclosure includes a coupler assembly for use with pipe comprising a unitary annular body, forming first and second cylindrical openings for surrounding a pipe or piping sections to facilitate forming a fluid-tight seal therein. The unitary annular body comprises a medial portion formed from a first material having a first durometer and first and second lateral portions integrally connected to opposite ends of the medial portion. The first and second lateral portions are made from a second material having a second durometer relatively higher than the first durometer of the first material. The coupler assembly further comprises at least one clamping assembly surrounding the unitary annular body member adapted for compressing the coupler assembly into a fluid-tight seal.

Another example embodiment of the present disclosure includes an annular coupling assembly for forming an impervious seal in a corrugated pipe or between two corrugated piping sections. The annular coupling assembly comprises an annular sealing element having first and second radial ends that are adapted for seating on inner liner extensions and between partial-transverse sections over a void in a corrugated pipe or between two corrugated piping sections. The annular sealing element further comprises inner and outer surfaces. The coupling assembly further comprises an arcuate region in situ located along the inner surface of the annular sealing element and at least one clamping assembly surrounding the annular sealing element adapted for compressing the arcuate region of the annular sealing element to a substantially flat surface to form a first sealing surface and compressing the arcuate region of the annular sealing element such that first and second radial ends translate and rotate to form a second sealing surface between the radial ends and partial-transverse sections in a corrugated pipe or between corrugated piping sections.

A further example embodiment of the present disclosure includes an annular coupling assembly for forming an impervious seal in a corrugated pipe or between two corrugated piping sections. The annular coupling assembly comprises a unitary annular body forming first and second cylindrical openings for surrounding a pipe or piping sections to facilitate forming a fluid-tight seal therein. The unitary annular body comprises a medial portion adapted for allowing a hinging motion during installation of the annular coupling assembly. The medial portion is made from a first material having a first durometer and first and second lateral portions integrally connected to opposite ends of the medial portion. The first and second lateral portions are made from a second material having a second durometer relatively higher than the first durometer of the first material. The annular coupling assembly further comprises at least one clamping assembly surrounding the unitary annular body member adapted for compressing the annular coupling assembly into a fluid-tight seal. The annular coupling assembly also comprises first and second hook ends located at the ends of first and second lateral portions respectively. The first and second hook ends provide a locking configuration for securing to a respective crest portion on corrugated piping structure during installation of the annular coupling assembly. The annular coupling assembly yet further comprises first and second locking clamps positioned within the first and second hook ends. The first and second locking clamps provide a locking configuration to form a fluid-tight connection during installation of the annular coupling assembly.

Yet another example embodiment of the present disclosure comprises an annular coupling assembly for providing a fluid tight seal between an opening between two pieces of pipe or over an opening formed in a pipe section. The annular coupling assembly comprises a unitary annular body member forming first and second annular openings for surrounding a pipe or piping sections. The unitary annular body member comprising a structural portion made from a first material having a first durometer and a sealing portion formed from a second material having a second durometer, the second durometer being relatively lower than the first durometer of the structural portion. The annular coupling assembly further comprises first and second stops extending from the structural portion for locating the annular coupling assembly between an opening between two pieces of pipe or over an opening formed in a pipe section and a channel formed within the structural portion between the first and second stops. The channel provides hinge-like flexibility for installing the annular coupling assembly over between an opening between two pieces of pipe or over an opening formed in a pipe section.

In yet another embodiment of the present disclosure comprises an annular coupling assembly providing a fluid-tight connection between two non-corrugated pipe sections. The coupling assembly includes a unitary annular body forming first and second cylindrical openings between two non-corrugated piping sections to facilitate forming a fluid-tight seal therein. The unitary annular body comprises medial and end portions made from a first material having a first durometer and spaced first and second sealing members. The sealing members are integrally connected with the medial and end portions and made from a second material having a second durometer relatively lower than the first durometer of the first material. The coupler further comprises an abutment projecting inwardly from the medial portion acting as a stop between ends of two non-corrugated piping sections during assembly.

Another example embodiment of the present disclosure comprises a coupler assembly for use with pipe comprising a unitary annular body forming first and second cylindrical openings for surrounding a pipe or piping sections to facilitate forming a fluid-tight seal therein. The unitary annular body comprising a medial portion and first and second lateral portions integrally connected at opposite ends of the medial portion, the medial, and first and second lateral portions are made from a first material having a first durometer. The coupler further comprises annular sealing members integrally formed with the first and second lateral portions. The annular sealing members are made from a second material having a second durometer relatively lower than the first durometer of the first material for forming a fluid-tight seal around a pipe or between piping sections. The coupler also comprises a reinforcing section integrally formed in the first material in the first and second lateral portions, the reinforcing sections covering at least a portion of the annular sealing members.

A further example embodiment of the present disclosure comprises coupler assembly for use with pipe comprising a unitary annular body forming first and second cylindrical openings for surrounding a pipe or piping sections to facilitate forming a fluid-tight seal therein. The unitary annular body comprising a medial portion and first and second lateral portions integrally connected at opposite ends of the medial portion, the medial, and first and second lateral portions are made from a first material having a first durometer. The coupler also comprises annular sealing members facing radially inward of the annular body and integrally formed with the first and second lateral portions, the annular sealing members are made from a second material having a second durometer relatively lower than the first durometer of the first material for forming a fluid-tight seal, around a pipe or between piping sections. The coupler also comprises a plurality of lobes extending from the annular sealing members, the plurality of lobes projecting away from the reinforcing section toward the medial portion for forming a fluid-tight sealing connection in a pipe or between piping sections such that insertion of a pipe into either of the first or second openings biases the contacting sealing members to a pressure enhancing seal. The coupler also has a reinforcing section integrally formed in the first material in the first and second lateral portions, the reinforcing sections in the first and second lateral portions overlying at least a portion of the annular sealing members, the reinforcing sections have a reduced cross-sectional area relative to the cross-sectional area of first and second lateral portions surrounding the reinforcing section.

Another embodiment of the present disclosure comprises a method of forming an annular coupling assembly used to form a fluid-tight seal in a pipe or between two pipe sections. The method comprises heating a first material having a first durometer to a prescribed temperature. The first material forms an annular body having a medial section, and first and second lateral portions integrally connected at opposite ends and reinforcing sections within the first and second lateral sections. The method also comprises heating a second material to a prescribed temperature, the second material having a second durometer relatively lower than the durometer of the first material, the second material forming sealing members for forming a fluid-tight seal. The method also includes forming the first and second materials such that the second material is integrally formed with the first material.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts unless described otherwise throughout the drawings and in which:

FIG. 1 is a perspective view of a pipe coupling assembly constructed in accordance with one embodiment of the disclosure forming a fluid-tight sealing connection between two corrugated pipe sections;

FIG. 4A is a partial sectional-side view of a pipe coupling assembly constructed in accordance with another embodiment of the present disclosure being positioned for forming a fluid-tight sealing connection between two corrugated pipe sections;

FIG. 4B is a partial sectional-side view of a pipe coupling assembly constructed in accordance with the embodiment of FIG. 4A of the present disclosure forming a fluid-tight sealing connection between two corrugated pipe sections;

FIG. 5 is a partial sectional-side view of a body clamping structure having a an attachment assembly for use with a pipe coupling assembly constructed in accordance with one embodiment of the present disclosure, facilitating the forming of a fluid-tight sealing connection between two pipe sections;

FIG. 6 is a partial sectional-side view of a pipe coupling assembly constructed in accordance with one embodiment of the disclosure forming a fluid-tight sealing connection between two non-corrugated pipe sections;

FIG. 7 is a partial sectional-side view of a pipe coupling assembly constructed in accordance with another embodiment of the disclosure forming a fluid-tight sealing connection between two non-corrugated pipe sections;

FIG. 13A is another example embodiment of the present disclosure illustrating a pipe coupling assembly constructed in accordance with one embodiment of the present disclosure; and FIG. 13B is a partial exploded sectional side-view of a portion of the example embodiment illustrated in FIG. 13A.

DETAILED DESCRIPTION

Figure 2A:
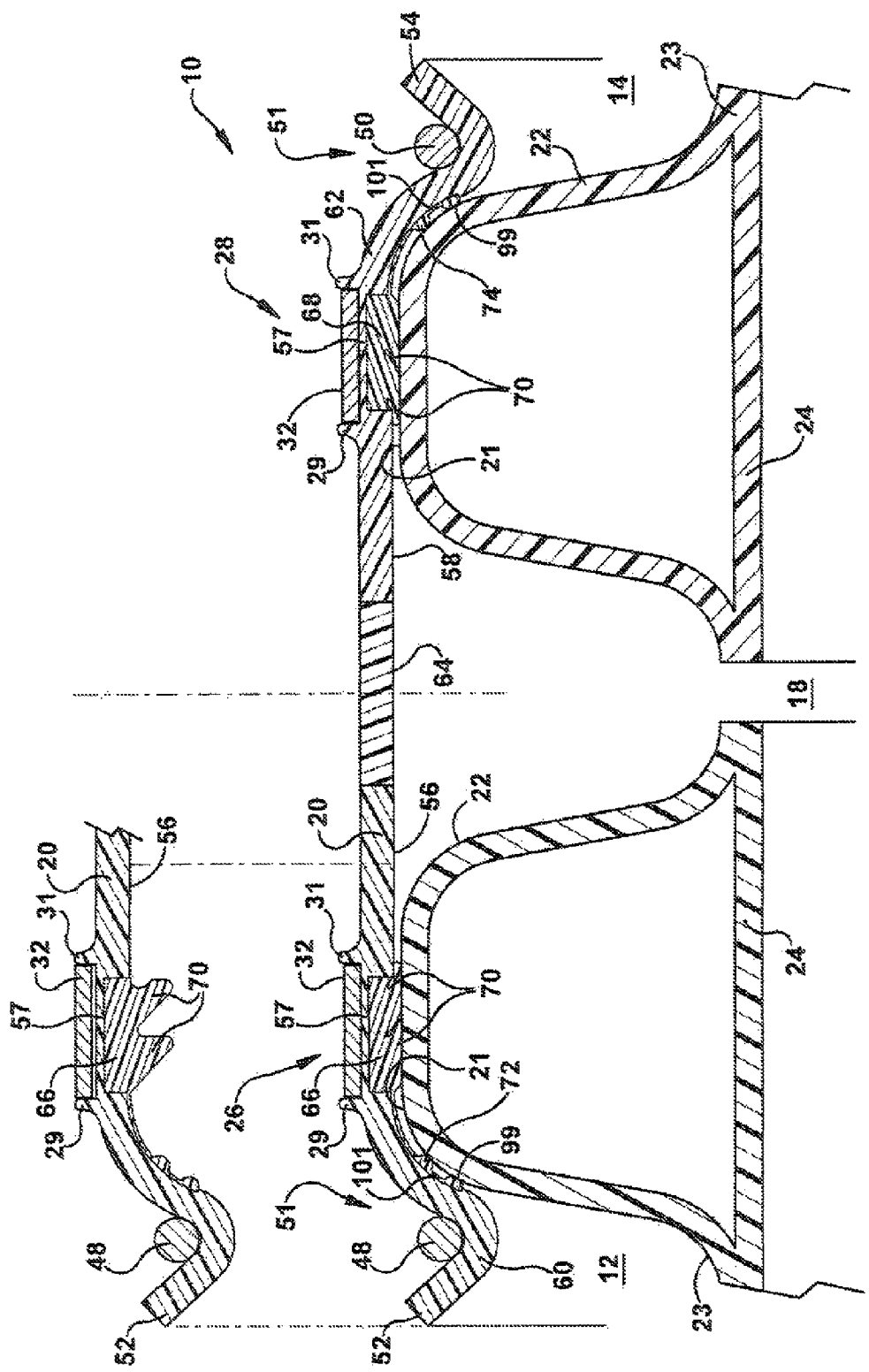
FIG. 2A is a partial sectional-side view of the pipe coupling assembly of FIG. 1 along section lines 2-2.

The present disclosure provides for pipe coupling assemblies for connecting two pieces of pipe, and more specifically, pipe coupling assemblies providing a fluid-tight connection between two pieces of piping, over a leak in a pipe, or separation in a single pipe. Referring to the figures, and in particular FIG. 1 is a perspective view of a pipe coupling assembly 10 constructed in accordance with one embodiment of the disclosure forming a fluid-tight sealing connection between first and second pipe sections 12, 14, respectively.

While the first and second 12, 14 pipe sections in FIG. 1 illustrate corrugated piping constructions, the pipe coupling assemblies of the present disclosure are used to couple other types of piping, including for example, polyvinyl chloride (PVC), straight metal piping, and the like without departing from the spirit and scope of the claimed invention. In addition, the pipe coupling assemblies of the present disclosure are designed to connect sections of piping during fabrication at manufacturing facilities, during installation of the pipe at its designated site, or to repair broken or leaking connections in the field.

Referring again to FIG. 1, the pipe coupling assembly 10 provides a fluid-tight connection between first 12 and second 14 pipe sections over a void 18 therebetween. The void 18 represents the space between the pipes sections that can range from several inches to a hairline break or fractures in either one of the pipe sections 12 or 14. The pipe coupling assembly 10 advantageously adapts first and second pipe sections 12, 14 together without having special geometrical constructions at the pipe section ends, such as bell and spigot configurations typically required in conventional piping connections. Accordingly, the pipe coupling assembly 10 reduces the expense and cost associated with forming special end configurations required or special sealing gaskets for connecting conventional corrugated piping sections. Further, the pipe coupling assembly 10 advantageously provides the flexibility of attaching two sections of piping or sealing a leak or leaks in an existing pipe at any location along the pipe. Yet another advantage provided by the coupling assembly 10 is its ability to connect any length of pipe, eliminating the need for standard pipe lengths having specialized end connections, such as bells and spigots.

The pipe coupling assembly 10 includes an annular body 20 formed of a unitary, tubular configuration that is circumferentially positioned around transverse corrugations 22 of first and second pipe sections 12, 14. Alternatively, for repairing a leak, the annular body 20 is circumferentially positioned around transverse corrugations of a single pipe section 12 or 14, or two pipe sections formed from a single pipe section. The unitary tubular configuration can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009 and assigned to SpringSeal Inc. of Streetsboro, Ohio. The U.S. Pat. No. 7,503,992 is incorporated herein by reference in its entirety for all purposes. The corrugated pipe sections 12, 14, include a plurality of crests 21 and valleys 23 and an inner pipe or liner 24 that can be independent or fused to the transverse corrugations 22, as best seen by the partial-sectional-side view of FIG. 2A.

The pipe coupling assembly 10 further comprises body clamping structures 26 and 28 positioned between first and second locating bosses 29, 31. In one embodiment, the body clamping structures 26 and 28 comprise an attachment assembly 30, as illustrated in FIG. 5. The attachment assembly 30 includes a circular strap 32 for securing the annular body 20 over the respective pipe sections 12, 14, during installation by locking together first and second ends 32a and 32b, respectively. The attachment assembly 30 further comprises a fastener 34 that passes through a clearance-hole 36 of a first fixture 38 secured to the first end 32a of the circular strap 32. The fastener 34 passes through a second clearance-hole 40 in a second fixture 42 secured to the second end 32b of the circular strap 32. The fastener 34 includes a threaded end 44 for adjustably securing the strap 32 in combination with a nut 46. Alternatively, as illustrated in the example embodiment of FIG. 5, the second clearance hole 40 is tapped or threaded, avoiding the need for the nut 46, as the fastener 34 engages at its threaded end 44 with the second fixture 42.

While the attachment assembly 30 illustrates one embodiment for securing the strap 32 over the annular body 20, other types of clamps, such as tie wraps, hose clamps, lever or toggle clamps, and the like, could also be used without departing from the spirit and scope of the claimed invention. Further, the attachment assembly 30 in the exemplary embodiment of FIGS. 2-4 is composed of nylon, but could also be made from steel, fiberglass, or plastic.

In addition to the security provided by the clamping structures 26 and 28 to the annular body 20, circular locking clamps 48, 50 are provided for securing first 52 and second 54 ends of the annular body over the crest 21 of the transverse corrugations 22 into the valleys 23. The circular locking clamps 48, 50 are adjusted and tightened in a similar fashion as the clamping structures associated with FIG. 5, or any other known clamping structures. Suitable examples include, but are not limited to, tie wraps, hose clamps, lever or toggle clamps, and turnbuckle clamps. The locking clamps 48 and 50 are positioned in troughs 51 of the valleys 23 formed at both ends 52 and 54 of the annular body 20. The troughs 51 hold the locking clamps in position when secured.

Figure 3:
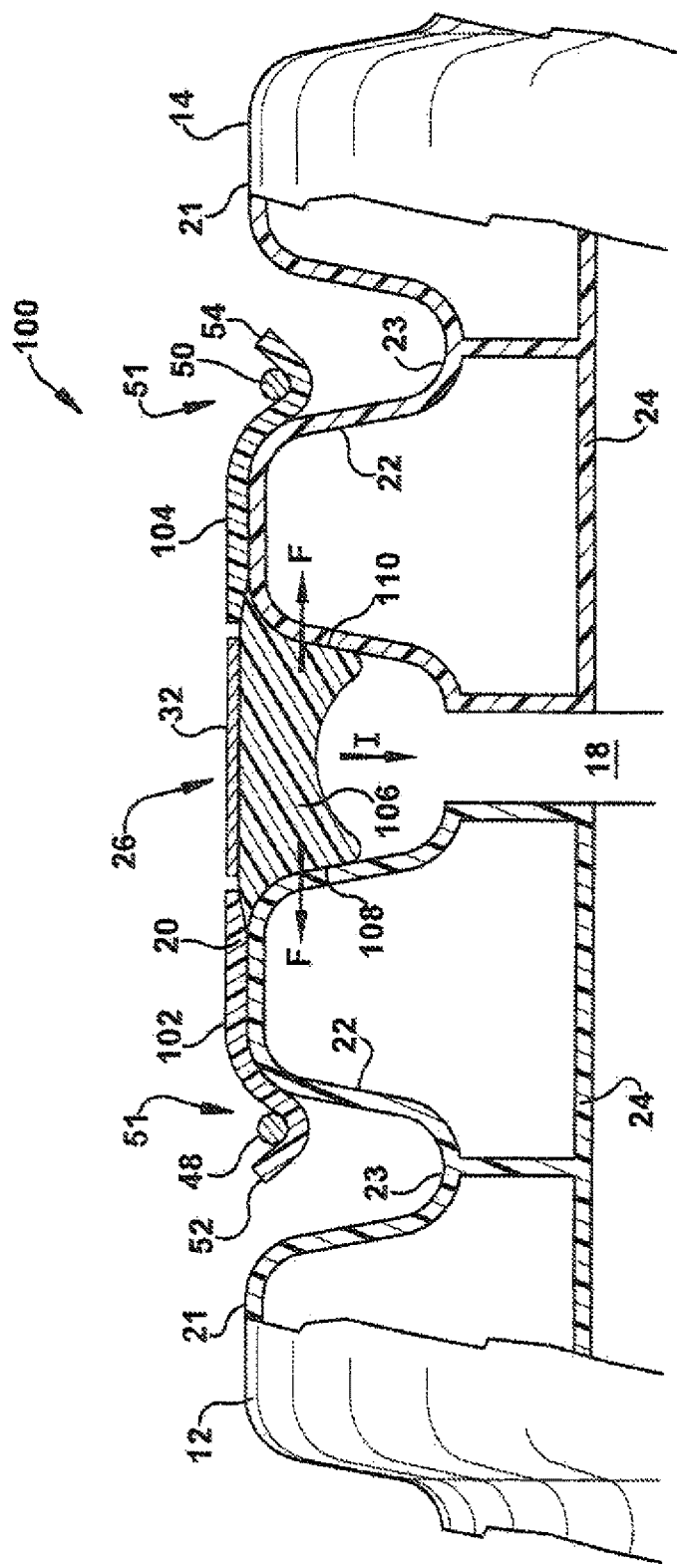
FIG. 3 is a partial sectional-side view of a pipe coupling assembly constructed in accordance with another embodiment of the present disclosure forming a fluid-tight sealing connection between two corrugated pipe sections.

The annular body 20 in the exemplary embodiment of FIG. 2A comprises a plurality of elastomeric materials unitarily formed by extruding or molding operations. The unitary annular body 20 comprises medial sections 56, 58 and end portions 60, 62 having a durometer ranging between 40-50 on a Shore D scale. It is noted that any material having such relative hardness and flexibility capable of handling the water pressure to prevent stretching or ballooning of the medial sections 56, 58 and end portions 60, 62 can be used, and examples of suitable materials include High Density Polyethylene ("HDPE") plastic and rigid polypropylene plastic. While a semi-flexible material, having a durometer ranging between 50 and 80 on a Shore A scale forms a flexing section 64. A suitable material for forming the flexing section 64 includes, but is not limited to, Santoprene® TPV 101-64 manufactured by Advanced Elastomer Systems L.P. located in Akron, Ohio. The medial sections 56, 58, and end portions 60, 62 help hold the shape of the annular body 20 over the piping sections 12, 14 with relatively little deformation. In contrast, flexing section 64 allows for deformation and permits hinge-like motion in the annular body in order to accommodate misalignment between pipe sections 12, 14 and ease of assembly, including installing the coupling assembly 10 during repairs in the field or over a leak in a single pipe section.

The annular body 20 further comprises first and second annular sealing members 66 and 68, respectively. The annular sealing members 66, 68 are made from a relatively lower durometer (ranging between approximately 40 to 60 on a Shore A scale) to form a pliable fluid-tight seal with the respective pipe sections 12 and 14 or over a leak in a single pipe section. Facilitating the pliable fluid-tight seal are lobes 70 projecting from the sealing members 66, 68 toward the void 18, producing a pressure enhancing seal. The lobes 70 are in contact with the crest 21 of respective pipe section 12, 14 and further deform upon the tightening of the circular straps 32 and/or locking clamps 48, 50. Reinforcing sections 57 ranging between 0.002" to 0.005" of an inch in thickness and extend from the medial sections 56, 58 of the 40-50 Shore D material to the end portions 60, 62 and between the straps 32 and sealing members 66, 68. The reinforcing sections 57 provide support to the annular member 20 and prevent penetration, ballooning, or tearing in the sealing members 66, 68 by the straps 32. However, it in some applications, the reinforcing sections 57 are removed to allow lower insertion force of the coupling assembly 10 over the corrugated pipe 20. By omitting the reinforcing sections 57, the sealing members 66, 68, because of their relatively softer material are allowed to stretch over the crests 21 portions of the corrugation. This allows more forgiveness in variations experienced in the manufacturing tolerances of the corrugation piping or flexibility that may be required in applications for the coupling assembly 10.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Located on the underside of the end portions 60, 62 of the annular body 20 are lubrication segments 72, 74 that are in contact with respective pipe section 12, 14. The lubricated segments 72, 74 are attached to the annular body 20 by molding, extruding, bonding, painting, spraying, impregnating, or any other known form of attachment of lubrication to an elastomeric, thermoplastic, polymeric, or rubber material. Further, the lubrication segments 72, 74 are formed from any known lubricants, including, but not limited to, polyethylene, polypropylene, polytetrafluoroethylene (TEFLON®), graphite powder/molybdenum disulfide, and silicone.

In one exemplary embodiment, the lubrication segments 72, 74 are molded or extruded into the annular body 20 from a permanently lubricated film having a low coefficient-of-friction "COF" and more specifically, a COF level of point five (0.5) or less. An example of such suitable material for the lubricated film includes polyethylene or polypropylene, which has an approximate COF of point three (0.3). The lubricated segments 72, 74 are relatively thin, having a thickness range between 0.001" to 0.010" inches, preferably ranging between 0.003" to 0.005" inches. The lubricated segments 72, 74 may further include protrusions 99 or ribs 101 to further enhance the sealing connection formed therein.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 10 for attaching the ends of any two-pipe sections. In the illustrated example embodiment of FIG. 2A, the annular body 20 is pushed onto the first pipe section 12, traversing the crest 21 of the transverse corrugation section 22 with the aid of lubrication segments 72, 74 until the respective trough 51 snaps into its respective valley 23, forcing the lobes 70 of the annular sealing member 66 toward the void 18 in a pressure enhancing orientation. Once the coupling assembly 10 covering the first pipe section 12 is in place, the second pipe section 14 is inserted into the annular body 20 until the respective trough 51 snaps into its respective valley 23, forcing the lobes 70 of the annular sealing member 68 toward the void 18 in a pressure enhancing orientation against respective crest 21. Body clamping structures 26 and 28 are then positioned over respective sealing members 66, 68 and tightened until achieving a secure fluid-tight seal. The locking clamps 48, 50 are similarly positioned and tightened in respective troughs 51 to hold the annular body 20 in position and further facilitate in forming the fluid-tight seal of the pipe coupling assembly 10.

In the field, upon discovering a leak, a contractor can cut along the leak of any piece of corrugated pipe at any location to form first and second pipe sections 12, 14 of FIG. 1 by using a saw, portable router, or knife. The pipe coupling assembly 10 is assembled over the pipe sections 12, 14 in a similar fashion as the method described above for assembly in a manufacturing facility or plant. However, in the field, the advantages of the flexible section 64 becomes more pronounced in assisting aligning the pipe sections where precise alignment is difficult, because of the piping being partially buried in the ground.

The construct of the pipe coupling assembly 10 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 10 is not limited to any particular size and could span several inches or even feet to adjoin separated pipe sections. In one embodiment, the pipe coupling assembly 10 has a diameter ranging from one (1") inch to sixty (60") inches that attach corresponding diameters in first and second pipe sections, 12 and 14, respectively. In the pipe coupling assembly 10 having a smaller scale of twelve (12") inches in diameter or less, for example, is suitable for residential and commercial applications. Further, in one embodiment, the annular body 20 covers several transverse sections 22 on each side before encountering the void 18 or leak in the piping section.

Figure 2B:
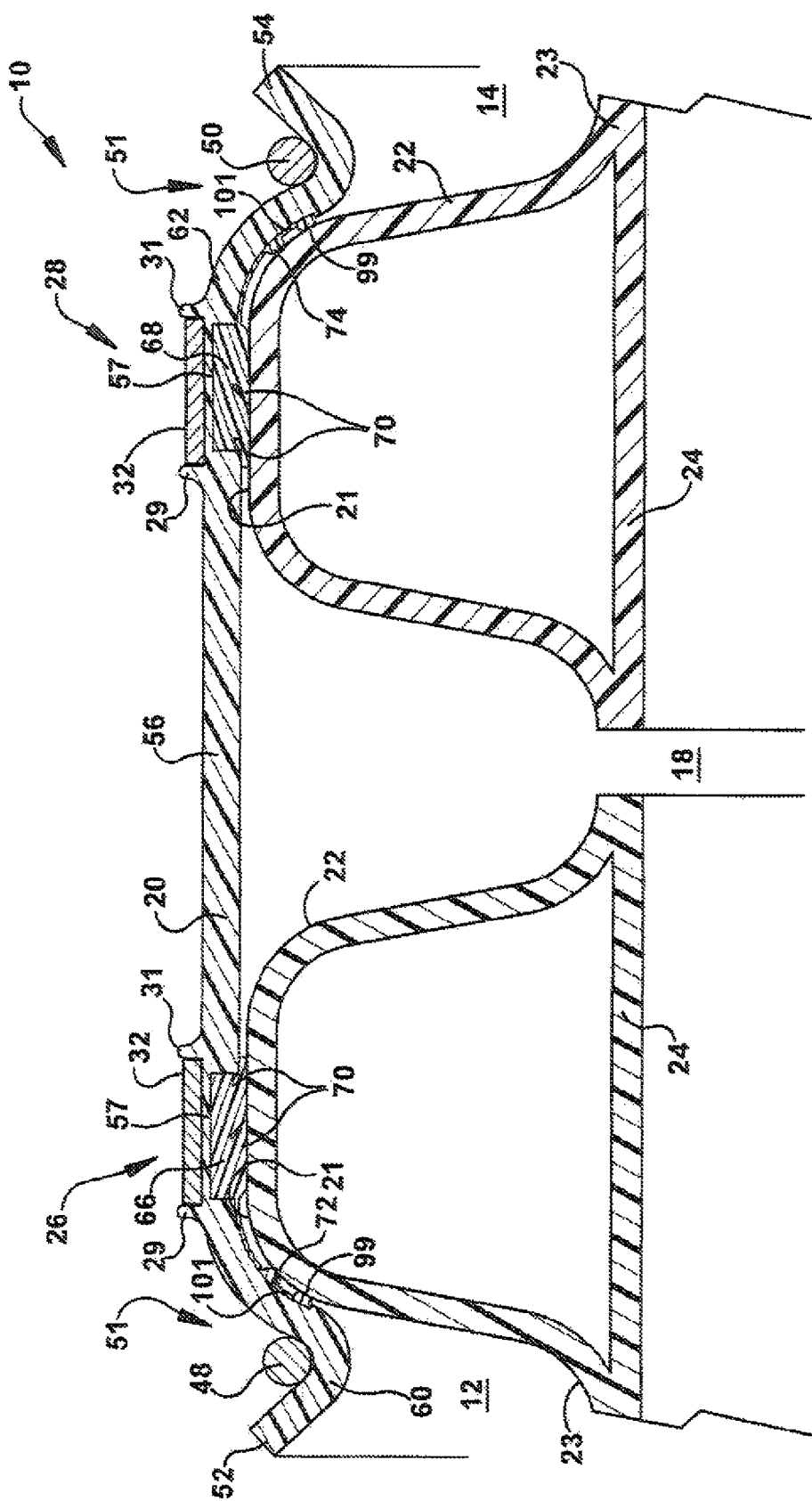
FIG. 2B is a partial sectional-side view of another example embodiment of a pipe coupling assembly constructed in accordance with the present disclosure forming a fluid-tight sealing connection between two corrugated pipe sections.

FIG. 2B illustrates a partial sectional-side view of another example embodiment of a pipe coupling assembly 10 constructed in accordance with the present disclosure forming a fluid-tight sealing connection between two pipe sections, or over a leak in a single pipe section. The annular body 20 in the exemplary embodiment of FIG. 2B comprises a plurality of elastomeric materials unitarily formed by extruding or molding operations. The unitary annular body 20 comprises a medial section 56 and end portions 60, 62 having a durometer ranging between 40-50 on a Shore D scale. It is noted that any material having such relative hardness and flexibility capable of handling the water pressure to prevent stretching or ballooning of the medial section 56 and end portions 60, 62 can be used, and examples of suitable materials include High Density Polyethylene ("HDPE") and rigid polypropylene plastic. The medial section 56 and end portions 60, 62 help hold the shape of the annular body 20 over the piping sections 12, 14.

The annular body 20 further comprises first and second annular sealing members 66 and 68, respectively. The annular sealing members 66, 68 are made from a relatively lower durometer (ranging between approximately 40 to 60 on a Shore A scale) to form a pliable fluid-tight seal with the respective pipe sections 12 and 14 or over a leak in a single pipe section. Facilitating the pliable fluid-tight seal are lobes 70 projecting from the sealing members 66, 68 toward the void 18, producing a pressure enhancing seal. The lobes 70 are in contact with the crest 21 of respective pipe section 12, 14 and further deform upon the tightening of the circular straps 32 and/or locking clamps 48, 50. Reinforcing sections 57 ranging between 0.002" to 0.005" of an inch in thickness and extend from the medial section 56 of the 40-50 Shore D material to the end portions 60, 62 and between the straps 32 and sealing members 66, 68. The reinforcing sections 57 provide support to the annular member 20 and prevent penetration, ballooning, or tearing in the sealing members 66, 68 by the straps 32. However, it in some applications, the reinforcing sections 57 are removed to allow lower insertion force of the coupling assembly 10 over the corrugated pipe 20. By omitting the reinforcing sections 57, the sealing members 66, 68, because of their relatively softer material are allowed to stretch over the crests 21 portions of the corrugation. This allows more forgiveness in variations experienced in the manufacturing tolerances of the corrugation piping or flexibility that may be required in applications for the coupling assembly 10.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Located on the underside of the end portions 60, 62 of the annular body 20 are lubrication segments 72, 74 that are in contact with respective pipe section 12, 14. The lubricated segments 72, 74 are attached to the annular body 20 by molding, extruding, bonding, painting, spraying, impregnating, or any other known form of attachment of lubrication to an elastomeric, thermoplastic, polymeric, or rubber material. Further, the lubrication segments 72, 74 are formed from any known lubricants, including, but not limited to, polyethylene, polypropylene, polytetrafluoroethylene (TEFLON®), graphite powder/molybdenum disulfide, and silicone.

In one exemplary embodiment, the lubrication segments 72, 74 are molded or extruded into the annular body 20 from a permanently lubricated film having a low coefficient-of-friction "COF" and more specifically, a COF level of point five (0.5) or less. An example of such suitable material for the lubricated film includes polyethylene or polypropylene, which has an approximate COF of point three (0.3). The lubricated segments 72, 74 are relatively thin, having a thickness range between 0.001" to 0.010" inches, preferably ranging between 0.003" to 0.005" inches. The lubricated segments 72, 74 may further include protrusions 99 or ribs 101 to further enhance the sealing connection therein.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 10 for attaching the ends of any two-pipe sections. In the illustrated example embodiment of FIG. 2B, the annular body 20 is pushed onto the first pipe section 12, traversing the crest 21 of the transverse corrugation section 22 with the aid of lubrication segments 72, 74 until the respective trough 51 snaps into its respective valley 23, forcing the lobes 70 of the annular sealing member 66 toward the void 18 in a pressure enhancing orientation. Once the coupling assembly 10 covering the first pipe section 12 is in place, the second pipe section 14 is inserted into the annular body 20 until the respective trough 51 snaps into its respective valley 23, forcing the lobes 70 of the annular sealing member 68 toward the void 18 in a pressure enhancing orientation against respective crest 21. Body clamping structures 26 and 28 are then positioned over respective sealing members 66, 68 and tightened until achieving a secure fluid-tight seal. The locking clamps 48, 50 are similarly positioned and tightened in respective troughs 51 to hold the annular body 20 in position and further facilitate in forming the fluid-tight seal of the pipe coupling assembly 10.

In the field, upon discovering a leak, a contractor can cut along the leak of any piece of corrugated pipe at any location to form first and second pipe sections 12, 14 of FIG. 1 by using a saw, portable router, or knife. The pipe coupling assembly 10 is assembled over the pipe sections 12, 14 in a similar fashion as the method described above for assembly in a manufacturing facility or plant.

The construct of the pipe coupling assembly 10 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 10 is not limited to any particular size and could span several inches or even feet to adjoin separated pipe sections. In one embodiment, the pipe coupling assembly 10 has a diameter ranging from one (1") inch to sixty (60") inches that attach corresponding diameters in first and second pipe sections, 12 and 14, respectively. In the pipe coupling assembly 10 having a smaller scale of twelve (12") inches in diameter or less, for example, is suitable for residential and commercial applications. Further, in one embodiment, the annular body 20 covers several transverse sections 22 on each side before encountering the void 18 or leak in the piping section.

Figure 2C:
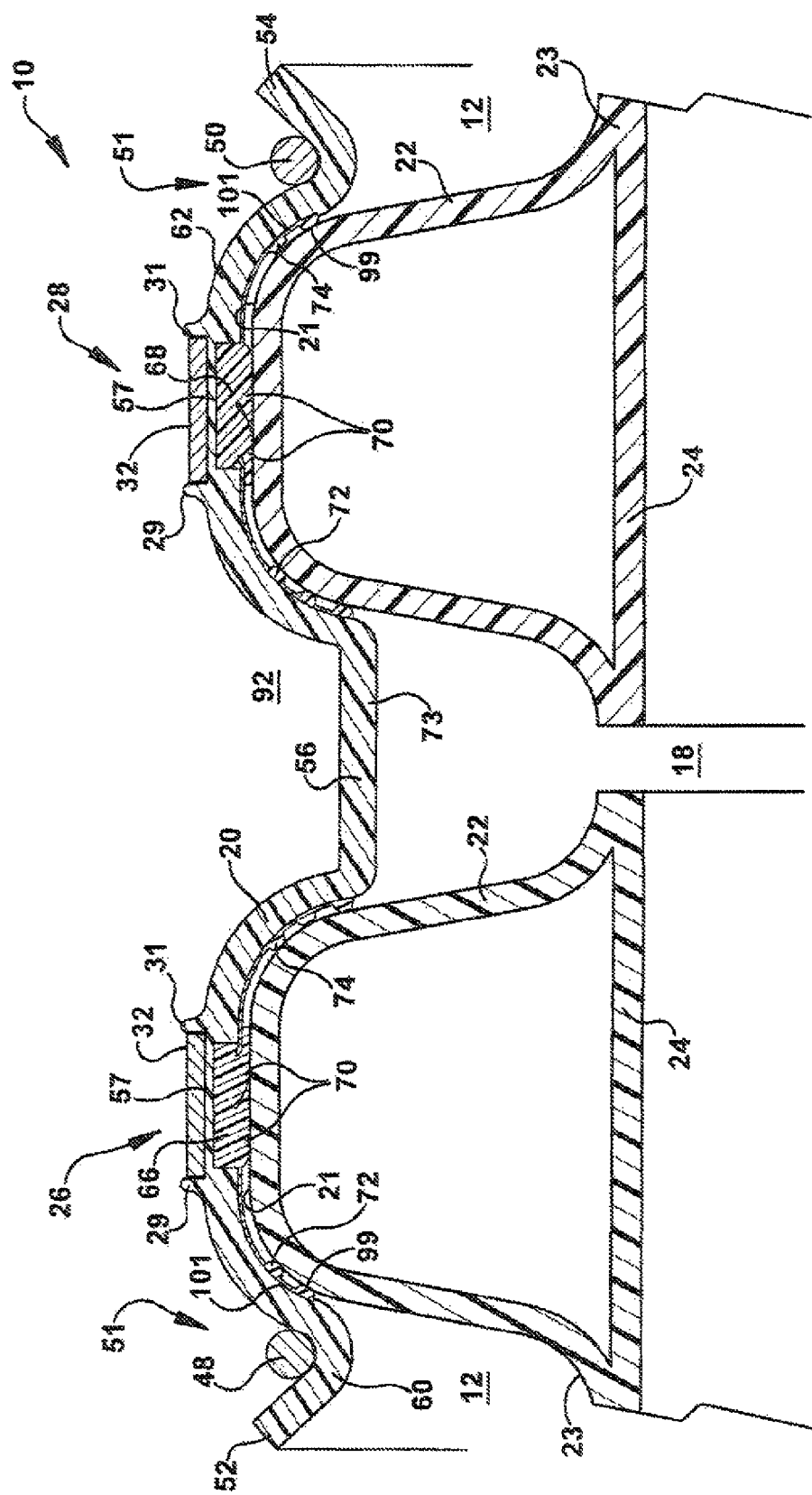
FIG. 2C is a partial sectional-side view of another example embodiment of a pipe coupling assembly constructed in accordance with the present disclosure forming a fluid-tight sealing connection between two corrugated pipe sections.

FIG. 2C illustrates a partial sectional-side view of another example embodiment of a pipe coupling assembly 10 constructed in accordance with the present disclosure forming a fluid-tight sealing connection between two pipe sections or over a leak of a single pipe section. The annular body 20 in the exemplary embodiment of FIG. 2C comprises a plurality of elastomeric materials unitarily formed by extruding or molding operations. The unitary annular body 20 comprises a medial section 56 that also acts as a stop 73 to facilitate the positioning of the coupling assembly 10 over the crests 21 of the corrugations 22 during installation. In particular, the stop 73 is constructed to form a channel along the annular member 20 such that the coupling assembly 10 pops into location acting as an indicator to the user that the coupling is properly seated.

Located laterally to the medial section 56 and stop 73 are and end portions 60, 62. The medial portion 56, stop 73 and end portions 60, 62 in the illustrated embodiment have a durometer ranging between 40-50 on a Shore D scale. It is noted that any material having such relative hardness and flexibility capable of handling the water pressure to prevent stretching or ballooning of the medial section 56, and end portions 60, 62 be used, and examples of suitable materials include High Density Polyethylene ("HDPE") and rigid polypropylene plastic. The medial section 56, stop 73 and end portions 60, 62 help hold the shape of the annular body 20 over the piping sections 12, 14 with relatively little deformation, or in the illustrated embodiment of FIG. 2C between a void in the first pipe section 12. However, in the field, the advantages of a channel 92 above the medial section 56 allow for hinge-like motion of the coupling assembly 10 during installation. The hinge-like motion becomes more pronounced in assisting aligning the pipe sections where precise alignment is difficult, because of the piping being partially buried in the ground.

Reinforcing sections 57 ranging between 0.002" to 0.005" of an inch in thickness and extend from the medial section 56 of the 40-50 Shore D material to the end portions 60, 62 and between the straps 32 and sealing members 66, 68. The reinforcing sections 57 provide support to the annular member 20 and prevent penetration, ballooning, or tearing in the sealing members 66, 68 by the straps 32. However, it in some applications, the reinforcing sections 57 are removed to allow lower insertion force of the coupling assembly 10 over the corrugated pipe 20. By omitting the reinforcing sections 57, the sealing members 66, 68, because of their relatively softer material are allowed to stretch over the crests 21 portions of the corrugation. This allows more forgiveness in variations experienced in the manufacturing tolerances of the corrugation piping or flexibility that may be required in applications for the coupling assembly 10.

The annular body 20 further comprises first and second annular sealing members 66 and 68, respectively. The annular sealing members 66, 68 are made from a relatively lower durometer material (ranging between approximately 40 to 60 on a shore A scale) to form a pliable fluid-tight seal with the respective sections of pipe 12 or pipe sections 12 and 14. Facilitating the pliable fluid-tight seal are lobes 70 projecting from the sealing members 66, 68 toward the void 18, producing a pressure enhancing seal. The lobes 70 are in contact with the crest 21 of respective sections of pipe 12 and further deform upon the tightening of the circular straps 32 and/or locking clamps 48, 50.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Located on the underside of the end portions 60, 62 and along inner walls of the stop 73 of the annular body 20 are lubrication segments 72, 74 that are in contact with respective sections of pipe 12. The lubricated segments 72, 74 are attached to the annular body 20 by molding, extruding, bonding, painting, spraying, impregnating, or any other known form of attachment of lubrication to an elastomeric, thermoplastic, polymeric, or rubber material. Further, the lubrication segments 72, 74 are formed from any known lubricants, including, but not limited to, polyethylene, polypropylene, polytetrafluoroethylene (TEFLON®), graphite powder/molybdenum disulfide, and silicone.

In one exemplary embodiment, the lubrication segments 72, 74 are molded or extruded into the annular body 20 from a permanently lubricated film having a low coefficient-of-friction "COF" and more specifically, a COF level of point five (0.5) or less. An example of such suitable material for the lubricated film includes polyethylene or polypropylene, which has an approximate COF of point three (0.3). The lubricated segments 72, 74 are relatively thin, having a thickness range between 0.001" to 0.010" inches, preferably ranging between 0.003" to 0.005" inches. The lubricated segments 72, 74 may further include protrusions 99 or ribs 101, further enhancing the sealing connection therebetween.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 10 for attaching the ends of any two-pipe sections. In the illustrated example embodiment of FIG. 2C, the annular body 20 is pushed onto the first pipe section 12, traversing the crest 21 until the stop 73 is engaged by the transverse corrugation section 22 with the aid of lubrication segments 72, 74, the respective trough 51 snapping into its respective valley 23, forcing the lobes 70 of the annular sealing member 66 toward the void 18 in a pressure enhancing orientation. Once the coupling assembly 10 covering the first section of pipe 12 is in place, the second section of pipe 12 is inserted into the annular body 20 until the stop 73 is engaged by the transverse corrugation section 22 with the aid of lubrication segments 72, 74, the respective trough 51 snapping into its respective valley 23, forcing the lobes 70 of the annular sealing member 68 toward the void 18 in a pressure enhancing orientation against respective crest 21. Body clamping structures 26 and 28 are then positioned over respective sealing members 66, 68 and tightened until achieving a secure fluid-tight seal. The locking clamps 48, 50 are similarly positioned and tightened in respective troughs 51 to hold the annular body 20 in position and further facilitate in forming the fluid-tight seal of the pipe coupling assembly 10.

In the field, upon discovering a leak, a contractor can cut along the leak of any piece of corrugated pipe at any location to form first and second pipe sections 12, 14 of FIG. 1 by using a saw, portable router, or knife. The pipe coupling assembly 10 is assembled over the pipe sections 12, 14 in a similar fashion as the method described above for assembly in a manufacturing facility or plant. During manufacturing and in the field, the hinge-like motion ability in the channel 92 assists in aligning the pipe sections where precise alignment is difficult. This reduces potential ergonomic issues as well reduces the installation force requirement when the alignment between piping is substantially inflexible or misaligned.

The construct of the pipe coupling assembly 10 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 10 is not limited to any particular size and could span several inches or even feet to adjoin separated pipe sections. In one embodiment, the pipe coupling assembly 10 has a diameter ranging from one (1") inch to sixty (60") inches that attach corresponding diameters in first and second pipe sections, 12 and 14, respectively. In the pipe coupling assembly 10 having a smaller scale of twelve (12") inches in diameter or less, for example, is suitable for residential and commercial applications. Further, in one embodiment, the annular body 20 covers several transverse sections 22 on each side before encountering the void 18 or leak in the piping section.

Figure 2D:
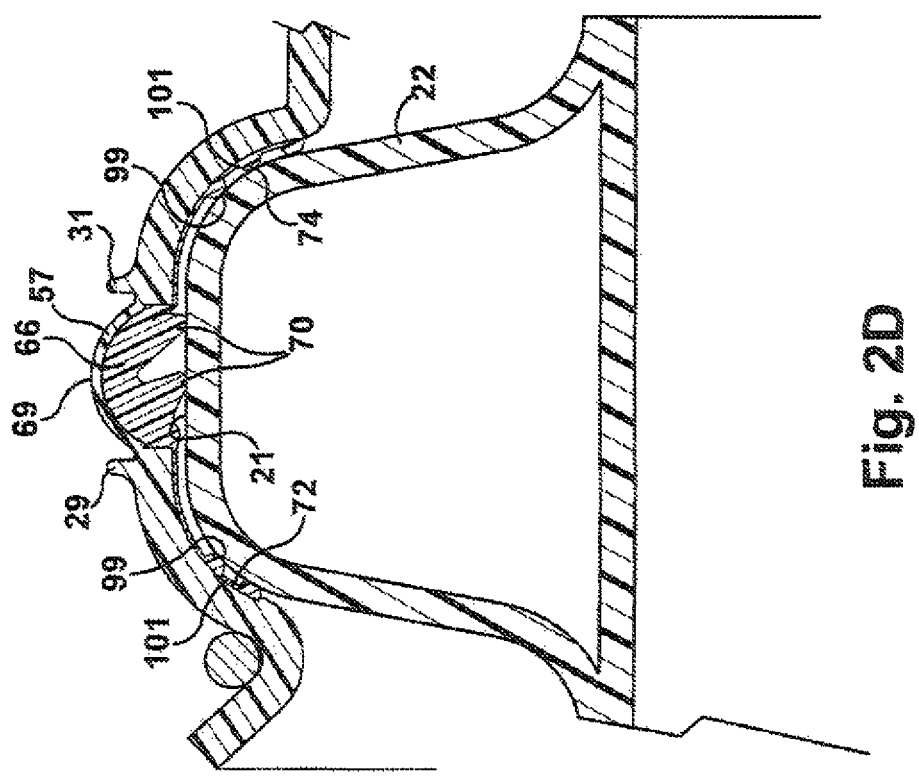
FIG. 2D is a partial sectional-side view of the example embodiment of the pipe coupling assembly of FIG. 2C prior to the insertion and tightening of circular straps.

FIG. 2D illustrates a partial sectional-side view of the example embodiment of the pipe coupling assembly 10 of FIG. 2C prior to the insertion of circular straps. The reinforcing sections 57 provide a visual indication regarding the seating of the coupling assembly 10 over the corrugated pipe section 22, by forming humps 69. The humps 69 are formed as a result of the sealing members 66, 68 being biased outward against the reinforcing sections 57, resulting from the added pressure of the contact created during insertion of the corrugated piping 22 into the coupling assembly 10. The humps 69 provide additional reassurance to the user that the coupling is properly positioned before adding the sealing clamps 32 in forming the fluid tight connection.

In a separate embodiment, the reinforcing sections 57 are absent from the annular body 20, and humps 69 used as a visual indicator are formed by the sealing members 66, 68. The humps 69 formed by the sealing members 66, 68 provide additional reassurance to the user that the coupling is properly positioned before adding the sealing clamps 32 in forming the fluid tight connection.

Figure 2E:
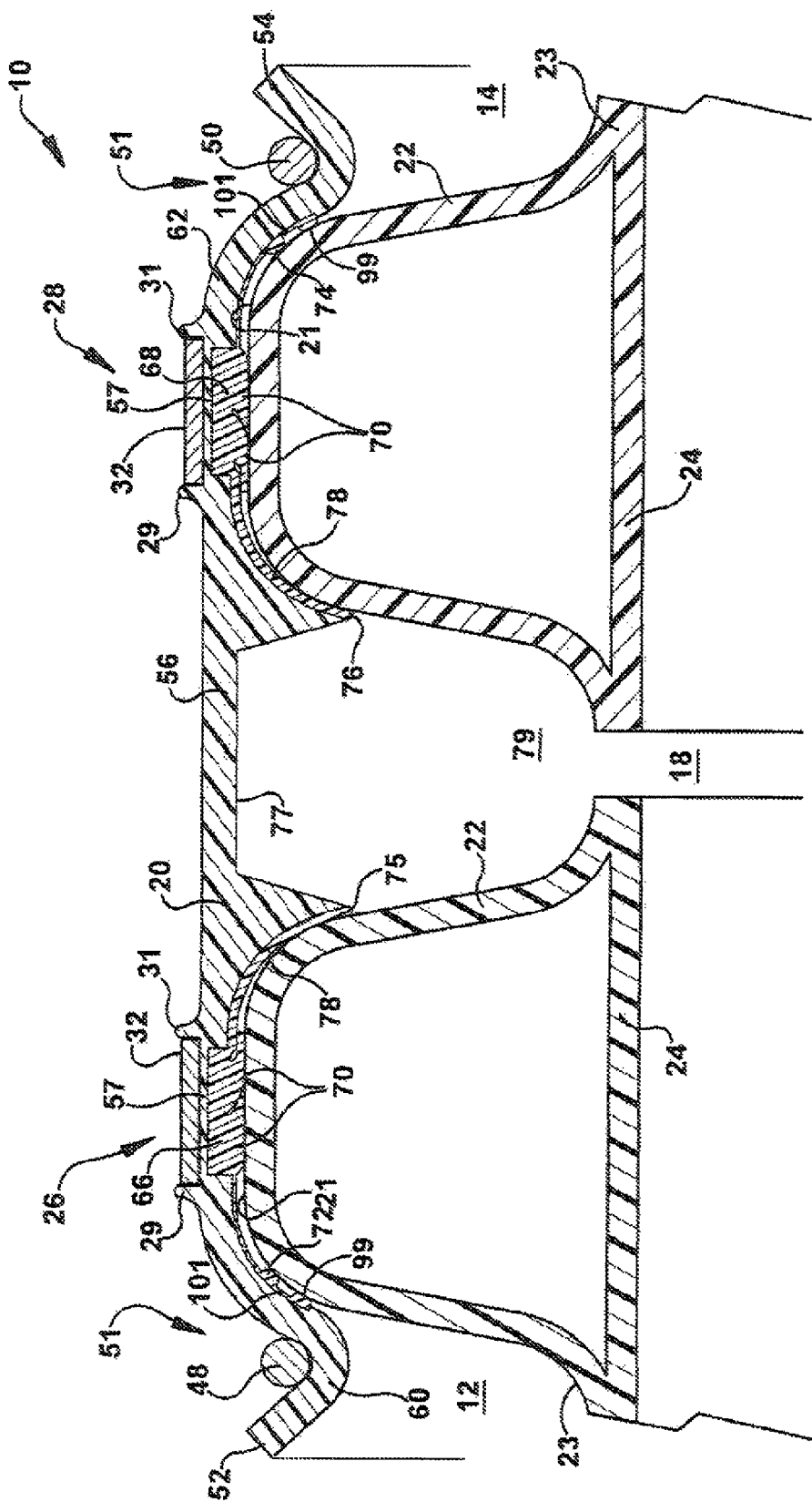
FIG. 2E is a partial sectional-side view of another example embodiment of a pipe coupling assembly constructed in accordance with the present disclosure forming a fluid-tight sealing connection between two corrugated pipe sections.

FIG. 2E illustrates a partial sectional-side view of another example embodiment of a pipe coupling assembly 10 constructed in accordance with the present disclosure forming a fluid-tight sealing connection between two pipe sections or over a leak of a single pipe section. The annular body 20 in the exemplary embodiment of FIG. 2E comprises a plurality of elastomeric materials unitarily formed by extruding or molding operations. The unitary annular body 20 comprises a medial section 56 that also includes arcuate stops 75, 76 along the inner portion of the annular body that facilitate the positioning of the coupling assembly 10 over the crests 21 of the corrugations 22 during installation. In particular, the stops 75, 76 are constructed to form a channel 77 along an inner portion 79 of the annular member 20 such that the coupling assembly 10 pops into location acting as an indicator to the user that the coupling is properly seated. The addition of the stops 75, 76 prevent the coupling assembly 10 from over traveling during installation by contacting the crest 21 of the corrugation once a sufficient amount of insertion is achieved. The annular body 20 along the medial portion 57 is further reduced in cross-sectional area, formed by the channel 77 that allows added flexibility between first 52 and second 54 ends of the annular body during assembly onto the pipe or pipes, 12, 14.

Located laterally to the medial section 56 and stops 75, 76 are and end portions 60, 62. The medial portion 56, stops 75, 76 and end portions 60, 62 in the illustrated embodiment have a durometer ranging between 40-50 on a Shore D scale. It is noted that any material having such relative hardness and flexibility capable of handling the water pressure to prevent stretching or ballooning of the medial section 56 and end portions 60, 62 can be used, and examples of suitable materials include High Density Polyethylene ("HDPE") and rigid polypropylene plastic. The medial section 56, stops 75, 76, and end portions 60, 62 help hold the shape of the annular body 20 over the piping sections 12, 14 with relatively little deformation. In contrast, the channel 77 allows for deformation and permits hinge-like motion in the annular body in order to accommodate misalignment between the pipe sections 12, 14 and ease of assembly, including, installing the coupling assembly 10 during repairs in the field or over a leak in a single pipe section.

Reinforcing sections 57 ranging between 0.002" to 0.005" of an inch in thickness and extend from the medial section 56 of the 40-50 Shore D material to the end portions 60, 62 and between the straps 32 and sealing members 66, 68. The reinforcing sections 57 provide support to the annular member 20 and prevent penetration, ballooning, or tearing in the sealing members 66, 68 by the straps 32. However, it in some applications, the reinforcing sections 57 are removed to allow lower insertion force of the coupling assembly 10 over the corrugated pipe 20. By omitting the reinforcing sections 57, the sealing members 66, 68, because of their relatively softer material are allowed to stretch over the crests 21 portions of the corrugation. This allows more forgiveness in variations experienced in the manufacturing tolerances of the corrugation piping or flexibility that may be required in applications for the coupling assembly 10.

The annular body 20 further comprises first and second annular sealing members 66 and 68, respectively. The annular sealing members 66, 68 are made from a relatively lower durometer material (ranging between approximately 40 to 60 on a Shore A scale) to form a pliable fluid-tight seal with the respective sections of pipe 12 or pipe sections 12 and 14. Facilitating the pliable fluid-tight seal are lobes 70 projecting from the sealing members 66, 68 toward the void 18, producing a pressure enhancing seal. The lobes 70 are in contact with the crest 21 of respective sections of pipes 12, 14 and further deform upon the tightening of the circular straps 32 and/or locking clamps 48, 50.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Located on the underside of the end portions 60, 62 and along inner walls of the stop 73 of the annular body 20 are lubrication segments 72, 74 that are in contact with respective sections of pipes 12, 14. The lubricated segments 72, 74 are attached to the annular body 20 by molding, extruding, bonding, painting, spraying, impregnating, or any other known form of attachment of lubrication to an elastomeric, thermoplastic, polymeric, or rubber material. Further, the lubrication segments 72, 74 are formed from any known lubricants, including, but not limited to, polyethylene, polypropylene, polytetrafluoroethylene (TEFLON®), graphite powder/molybdenum disulfide, and silicone.

In one exemplary embodiment, the lubrication segments 72, 74 are molded or extruded into the annular body 20 from a permanently lubricated film having a low coefficient-of-friction "COF" and more specifically, a COF level of point five (0.5) or less. An example of such suitable material for the lubricated film includes polyethylene or polypropylene, which has an approximate COF of point three (0.3). The lubricated segments 72, 74 are relatively thin, having a thickness range between 0.001" to 0.010" inches, preferably ranging between 0.003" to 0.005" inches. The lubricated segments 72, 74 may further include protrusions 99 or ribs 101 to further enhance the sealing connections therein.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 10 for attaching the ends of any two-pipe sections. In the illustrated example embodiment of FIG. 2E, the annular body 20 is pushed onto the first pipe section 12 that traverses the crest 21 until the stop 75 is engaged by the transverse corrugation section 22 with the aid of lubrication segments 72, 74, the respective trough 51 snapping into its respective valley 23, forcing the lobes 70 of the annular sealing member 66 toward the void 18 in a pressure enhancing orientation. Once the first section of pipe 12 is in place, the second section of pipe 14 is inserted into the annular body 20 until the stop 76 is engaged by the transverse corrugation section 22 with the aid of lubrication segments 72, 74, the respective trough 51 snapping into its respective valley 23, forcing the lobes 70 of the annular sealing member 68 toward the void 18 in a pressure enhancing orientation against respective crests 21. Body clamping structures 26 and 28 are then positioned over respective sealing members 66, 68 and tightened until achieving a secure fluid-tight seal. The locking clamps 48, 50 are similarly positioned and tightened in respective troughs 51 to hold the annular body 20 in position and further facilitate in forming the fluid-tight seal of the pipe coupling assembly 10.

In the field, upon discovering a leak, a contractor can cut along the leak of any piece of corrugated pipe at any location to form first and second pipe sections 12, 14 of FIG. 1 by using a saw, portable router, or knife. The pipe coupling assembly 10 is assembled over the pipe sections 12, 14 in a similar fashion as the method described above for assembly in a manufacturing facility or plant.

The construct of the pipe coupling assembly 10 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 10 is not limited to any particular size and could span several inches or even feet to adjoin separated pipe sections. In one embodiment, the pipe coupling assembly 10 has a diameter ranging from one (1") inch to sixty (60") inches that attach corresponding diameters in first and second pipe sections, 12 and 14, respectively. In the pipe coupling assembly 10 having a smaller scale of twelve (12") inches in diameter or less, for example, is suitable for residential and commercial applications. Further, in one embodiment, the annular body 20 covers several transverse sections 22 on each side before encountering the void 18 or leak in the piping section.

Referring now to FIG. 3 is a partial sectional-side view of a pipe coupling assembly 100 constructed in accordance with another embodiment of the present disclosure forming a fluid-tight sealing connection between first and second pipes sections 12 and 14, respectively. While the first and second 12, 14 pipe sections in FIG. 3 illustrate corrugated piping constructions, the pipe coupling assemblies of the present disclosure could be used to couple other types of piping, including for example, polyvinyl chloride (PVC), straight metal piping, and the like without departing from the spirit and scope of the claimed invention. In addition, the pipe coupling assemblies of the present disclosure are designed to connect sections of piping during fabrication at manufacturing facilities, during installation of the pipe at its designated site, or to repair broken or leaking connections in the field.

The pipe coupling assembly 100 provides a fluid-tight connection between first 12 and second 14 pipe sections over a void 18 therebetween. The void 18 represents the space between the pipes sections that can range from several inches to a hairline break or fracture in either one of the pipe sections 12, 14. The pipe coupling assembly 100 advantageously adapts first and second pipe sections 12, 14 together without having special geometrical constructions at the pipe section ends, such as a bell and spigot configuration required in conventional piping connections. Accordingly, the pipe coupling assembly 100 reduces the expense and cost associated with forming special ends required or special sealing gaskets for connecting conventional corrugated piping sections. Further, the pipe coupling assembly 100 advantageously provides the flexibility of attaching two sections of piping or sealing a leak in an existing pipe at any location along the pipe.

The pipe coupling assembly 100 includes an annular body 20 formed of a unitary tubular configuration circumferentially positioned around transverse corrugations 22 of first and second pipe sections 12, 14. The unitary tubular configuration can be formed by welding opposite ends of the annular body 20 together. The corrugated pipe sections 12, 14, include an inner pipe or liner 24 that can be independent or fused to the transverse corrugations 22 as best seen by the partial-sectional-side view of FIG. 3.

The pipe coupling assembly 100 further comprises a body clamping structure 26. In one embodiment, the body clamping structure 26 comprises an attachment assembly 30, as illustrated in FIG. 5. While the attachment assembly 30 illustrates one embodiment for securing a strap 32 over the annular body 20, other types of clamps, such as tie wraps, hose clamps, lever or toggle clamps, and the like, could also be used without departing from the spirit and scope of the claimed invention. Further, the attachment assembly 30 in the exemplary embodiment of FIG. 3 is composed of nylon, but could also be made from steel, fiberglass, or plastic.

In addition to the security provided by the clamping structure 26 to the annular body 20, circular locking clamps 48, 50 are provided for securing first 52 and second 54 ends of the annular body over the crest 21 of the transverse corrugations 22 into the valleys 23. The circular locking clamps 48, 50 are adjusted and tightened in a similar fashion as the clamping structures associated with FIG. 5, or any other known clamping structures. Suitable examples include, but are not limited to, tie wraps, hose clamps, lever or toggle clamps, and turnbuckle clamps. The locking clamps 48 and 50 are positioned in troughs 51 formed at both ends 52 and 54 of the annular body 20. The troughs 51 hold the locking clamps in position when secured in the valleys 23 of the transverse corrugations 22.

The annular body 20 in the exemplary embodiment of FIG. 3 comprises a plurality of elastomeric materials unitarily connected by molding or extruding processes. The unitary annular body 20 has a relatively higher durometer material that forms lateral sections 102, 104 that extend to first and second ends 52, 54. While a semi-flexible material, having a relatively lower durometer forms a circular wedging member 106 that adjoins lateral sections 102, 104 in the unitary annular body 20. The lateral sections 102, 104 assist in holding the shape of the annular body 20 over the piping sections 12, 14 with relatively little deformation. In contrast, wedging member 106 allows for deformation and permits hinge-like motion in the annular body 20 in order to accommodate misalignment between the pipe sections 12, 14 and ease of assembly, especially for repairs in the field. Further, the circular wedge member 106 is positioned between transverse corrugation members 22, biasing an alignment between pipes sections 12 and 14 during tightening of the pipe coupling assembly 100. The clamping structure 26 and its strap 32 is positioned over the circular wedge member 106 such that upon tightening, the wedging member is forced inward (in direction of arrow "I"), producing a lateral force (in direction of arrows "F") outward, as a result of the inclined planes 108 and 110 on the surface of the circular wedge member, forming a pressure enhancing seal. As a result, the wedge member 106 produces a fluid-tight seal along the surface of the inclined planes 108, 110 and along the crests 21 of the corrugated transverse members 22 along the lateral sections 102, 104 with the void 18. Further, the tightening of the clamping structure 26 upon the strap 32 over the circular wedging member produces the lateral forces F outward toward the transverse members 22, which in turn, causes a resulting force to be applied to the locking clamps 48, 50, providing additional security to the pipe coupling assembly 100.

In one example embodiment, the relatively higher durometer material that forms the lateral sections 102, 104 is an elastomeric material having a durometer ranging between 60 and 80 on a Shore A scale or 40 to 50 on a Shore D scale. In one example embodiment, the relatively lower durometer material that forms circular wedge member 106 is an elastomeric material having a durometer range between 40 and 60 durometer on a Shore A scale. An example of such material includes ASTM F477 Low Head material (ASTM F477 LH), which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

During the manufacturing of the piping sections in for example, a plant or manufacturing facility, an operator can attach two pipe sections 12, 14 without the need for any special end configurations, such as a spigot or bell typically required in conventional corrugated piping. Instead, the operator can use the coupling assembly 100 for attaching the ends of any two-pipe sections. In the illustrated example embodiment of FIG. 3, the annular body 20 is pushed onto the first pipe section 12 that traverses the transverse corrugation section 22 until the respective trough 51 snaps into its respective valley 23. Once the pipe coupling assembly 10 covering the first pipe section 12 is in place, the second pipe section 14 is inserted into annular body 20 until the respective trough 51 snaps into its respective valley 23. Body clamping structure 26 is then positioned over the circular wedging member 106 and tightened until achieving a secure fluid-tight seal. The locking clamps 48, 50 are similarly positioned and tightened to hold the annular body 20 in position and further facilitate in forming the fluid-tight seal of the pipe coupling assembly 100.

In the field, upon discovering a leak, a contractor can cut along the leak of any piece of corrugated pipe at any location to form first and second pipe sections 12, 14 of FIG. 3 by using a saw, portable router, or knife. The pipe coupling assembly 100 is assembled over the pipe sections 12, 14 in a similar fashion as the method described above for assembly in a manufacturing facility or plant. However, in the field, the advantages of the circular wedging member 106 becomes more pronounced in assisting aligning the pipe sections where precise alignment is difficult, because of the piping being partially buried in the ground.

The overall length of the pipe coupling assembly 100 is not limited to any particular size and could span several inches or even feet to adjoin separated pipe sections. In one embodiment, the pipe coupling assembly 100 has a diameter ranging from one (1") inch to sixty (60") inches that attach corresponding diameters in first and second pipe sections, 12 and 14, respectively. In the pipe coupling assembly 10 having a smaller scale of twelve (12") inches in diameter or less, for example, is suitable for residential and commercial applications. Further, in one example embodiment, the annular body 20 covers several transverse sections 22 on each side before encountering the void 18 or leak in the piping section.

Illustrated in FIGS. 4A and 4B is a partial sectional-side view of a pipe coupling assembly 200 constructed in accordance with another embodiment of the present disclosure forming a fluid-tight sealing connection between first 12 and second 14 pipe sections. The pipe coupling assembly of FIGS. 4A and 4B is designed to connect sections of piping during fabrication at manufacturing facilities, during installation of the pipe at its designated site, or to repair broken or leaking connections in the field.

The pipe coupling assembly 200 of FIGS. 4A and 4B provides a fluid-tight connection between first 12 and second 14 pipe sections over a void 18 therebetween. The void 18 represents the space between the pipes sections that can range from several inches to a hairline break or fracture in either one of the pipe sections 12, 14. The pipe coupling assembly 200 advantageously adapts first and second pipe sections 12, 14 together without having special geometrical constructions at the pipe section ends such as a bell and spigot configuration required in conventional piping connections. Accordingly, the pipe coupling assembly 200 reduces the expense and cost associated with forming special ends required or special sealing gaskets for connecting conventional corrugated piping sections. Further, the pipe coupling assembly 200 advantageously provides the flexibility of attaching two sections of piping or sealing a leak in an existing pipe at any location along the pipe.

The pipe coupling assembly 200 includes a sealing body member 202 formed of a unitary tubular configuration circumferentially positioned between transverse corrugations 22 of first and second pipe sections 12, 14. FIG. 4A illustrates the sealing body member 202 being positioned for forming a sealing connection, while FIG. 4B illustrates the body sealing member being clamped into position to form the sealing connection with void 18 between first and second pipe sections 12, 14. The unitary tubular configuration of the sealing body member 202 can be formed by welding opposite ends of the annular body 20 together. The corrugated pipe sections 12, 14, include a plurality of crests 21 and valleys 23 and an inner pipe or liner 24 that can be independent or fused to the transverse corrugations 22 as best seen by the partial-sectional-side view of FIGS. 4A and 4B.

The sealing body member 202 includes an arcuate region 203 in situ, biasing outward from the void 18, as illustrated in FIG. 4A. The arcuate region 203 provides flexibility to the tolerances in sizing the sealing body member 202 with the pipe sections 12, 14, and facilitates forming two separate sealing surfaces, as discussed below when assuming a secured position as illustrated in FIG. 4B.

The pipe coupling assembly 200 further comprises a body clamping structure 26. In one embodiment, the body clamping structure 26 comprises an attachment assembly 30, as illustrated in FIG. 5. While the attachment assembly 30 illustrates one embodiment for securing a strap 32 over the sealing body member 202, other types of clamps such as tie wraps, hose clamps, lever or toggle clamps, and the like, could also be used without departing from the spirit and scope of the claimed invention. Further, the attachment assembly 30 in the exemplary embodiment of FIGS. 4A and 4B is composed of nylon, but could also be made from steel, fiberglass, or plastic.

During assembly, the body member 202 is positioned over the inner pipe or liner 24 and between the crest 21 and valley 23 of a partial-transverse section 204 on each respective first and second pipe sections 12, 14, respectively. The strap 32 is located between annular bosses 205 that assist in locating the strap prior to, and during the securing of the body clamping structure 26.

The partial-transverse sections 204 include an extending portion 206 that assists in positioning body member 202 between the crest 21 and valley 23 of the partial-transverse sections 204. Upon adjusting the clamping structure 26 to a tightening position illustrated in FIG. 4B, the strap 32 draws the body member 202 to a substantially flat and sealed orientation to form at least one sealing surface 208. As the strap 32 draws the body member 202 into the sealing position of FIG. 4B, the arcuate region 203 is reduced, extending the overall diameter of the body member 202 to form a second sealing surface 210 with the partial-transverse sections 204. The sealing surface 208 provides a fluid-tight seal with the void 18 along the surface of the liner 24 and body member 202 in each piping section 12, 14. The second sealing surface 210 provides a fluid-tight seal with the void 18 between the body member 202 and partial transverse section 204 on each pipe section 12, 14 once the clamping structure 26 is adjusted to a tightening sealing position, shown in FIG. 4B. During the adjusting of the clamping structure 26, radial ends 212 of the body member 202 translate and rotate, forcing the second sealing surface 210 outward as the arcuate region 203 is reduced in the direction of the arrows "O", allowing for variations in length between extending liner sections 214 and the body member 202 when in the compressed sealed state of FIG. 4B.

The sealing body member 202 in the exemplary embodiment of FIGS. 4A and 4B comprises a semi-flexible elastomeric material. In one example embodiment, the semi-flexible elastomeric material has a durometer range between 40 and 60 on a Shore A scale. An example of such material includes ASTM F477 Low Head material (ASTM F477 LH), which has a durometer of 50 plus or minus five. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

During the manufacturing of the piping sections in for example, a plant or manufacturing facility, an operator can attach two pipe sections 12, 14 without the need for any special end configurations, such as a spigot or bell typically required in conventional corrugated piping. Instead, the operator can use the coupling assembly 200 for attaching the ends of any two-pipe sections. In the illustrated example embodiment of FIGS. 4A and 4B, the pipe sections 12, 14 are cut along any section of the pipe to allow the liner 24 to have extending liner sections 214 for positioning of an annular body 202 and for forming the first sealing surface 208. The transverse corrugated sections 22 are also cut to prevent lateral movement of the annular body 202 and for forming a second sealing surface 210 as described above. The clamping structure 26 is then positioned over the body member 202 and tightened until achieving a secure fluid-tight seal along first 208 and second 210 sealing surfaces.

In the field, upon discovering a leak, a contractor can cut along the leak of any piece of corrugated pipe length to form first and second pipe sections 12, 14 of FIGS. 4A and 4B by using a saw, portable router, or knife. The pipe coupling assembly 200 is assembled over the pipe sections 12, 14 in a similar fashion as the method described above for assembly in a manufacturing facility or plant. However, in the field, the flexible material forming the annular body member 202 may become more advantageously apparent in assisting in the alignment of the pipe sections were precise alignment is difficult as a result of the piping being partially buried in the ground.

The overall length of the pipe coupling assembly 200 is not limited to any particular size and could span several inches or even feet to adjoin separated pipe sections. In one embodiment, the pipe coupling assembly 200 has a diameter ranging from one (1") inch to sixty (60") inches that attach corresponding diameters in first and second pipe sections, 12 and 14, respectively. In the pipe coupling assembly 200 having a smaller scale of twelve (12") inches in diameter or less, for example, is suitable for residential and commercial applications. Further, in one example embodiment, the annular body member 202 can cover several inches of extending liner sections 214 on each piping section 12, 14 before encountering the void 18 or leak in the piping section.

FIG. 6 is a partial sectional-side view of a pipe coupling assembly 300 constructed in accordance with one embodiment of the disclosure forming a fluid-tight sealing connection between two non-corrugated pipe sections, namely first section 312 and second section 314. The pipe coupling assembly 300 of FIG. 6 is designed to connect sections of piping during fabrication at manufacturing facilities, during installation of the pipe at its designated site, or to repair broken or leaking connections in the field.

The pipe coupling assembly 300 of FIG. 6 provides a fluid-tight connection between first 312 and second 314 pipe sections over a void 18 therebetween. The void 18 represents the space between the pipes sections that can range from several inches to a hairline break or fracture in either one of the pipe sections 312, 314. The pipe coupling assembly 300 advantageously adapts non-corrugated pipe sections 312 and 314 together without having special geometrical constructions at the pipe section ends, such as a hub-type connection. Such examples of non-corrugated pipe sections include, but are not limited to, polyvinyl chloride ("PVC"), cast iron, black piping and the like. Advantageously, the pipe coupling assembly 300 provides the flexibility of attaching two sections of piping or the ability to seal a leak in an existing pipe at any location along the pipe.

The pipe coupling assembly 300 includes an annular body 20 formed of a unitary, tubular configuration that is circumferentially positioned around first and second pipe sections 312, 314. Alternatively, for repairing a leak, the annular body 20 is circumferentially positioned around a single pipe section 312 or 314, or two pipe sections formed from a single pipe section. The unitary tubular configuration can be formed by welding opposite ends of the annular body 20 together.

The pipe coupling assembly 300 further comprises body clamping structures 26 and 28 positioned between first and second locating bosses 29, 31. In one embodiment, the body clamping structures 26 and 28 comprise an attachment assembly 30, as illustrated in FIG. 5. While the attachment assembly 30 illustrates one embodiment for securing the strap 32 over the annular body 20, other types of clamps, such as tie wraps, hose clamps, lever or toggle clamps, and the like, could also be used without departing from the spirit and scope of the claimed invention. Further, the attachment assembly 30 in the exemplary embodiment of FIG. 6 is composed of nylon, but could also be made from steel, fiberglass, or plastic.

The annular body 20 in the exemplary embodiment of FIG. 6 comprises a plurality of elastomeric materials unitarily formed by extruding or molding operations. The unitary annular body 20 comprises medial sections 56, 58 and end portions 352, 354 having a durometer ranging between 40-50 on a Shore D scale. It is noted that any material having such relative hardness and flexibility capable of handling the water pressure to prevent stretching or ballooning of the medial sections 56, 58 and end portions 60, 62 can be used, and examples of suitable materials include High Density Polyethylene ("HDPE") plastic and rigid polypropylene plastic. While a semi-flexible material, having a durometer ranging between 50 and 80 on a Shore A scale forms a flexing section 306. A suitable material for forming the flexing section 306 includes, but is not limited to, Santoprene® TPV 101-64 manufactured by Advanced Elastomer Systems L.P. located in Akron, Ohio. The medial sections 56, 58, and end portions 352, 354 help hold the shape of the annular body 20 over the piping sections 312, 314 with relatively little deformation. In contrast, flexing section 306 allows for deformation and permits hinge-like motion in the annular body in order to accommodate misalignment between the pipe sections 312, 314 and ease of assembly, including installing the coupling assembly 300 during repairs in the field or over a leak in a single pipe section. The end portions 352 and 354 further provide a flanged opening ("A") that allows for guided installation of the coupling assembly 300 over the ends of respective pipe sections 312, 314.

The annular body 20 further comprises first and second annular sealing members 66 and 68, respectively. The annular sealing members 66, 68 are made from a relatively lower durometer (ranging between approximately 40 to 60 on a Shore A scale) to form a pliable fluid-tight seal with the respective pipe sections 312 and 314 or over a leak in a single pipe section. Facilitating the pliable fluid-tight seal are lobes 70 projecting from the sealing members 66, 68 toward the void 18, producing a pressure enhancing seal. The lobes 70 are in contact with the respective pipe section 312, 314 and further deform upon the tightening of the circular straps 32. Reinforcing sections 57 ranging between 0.002" to 0.005" of an inch in thickness and extend from the medial sections 56, 58 of the 40-50 Shore D material to the end portions 352, 354 and between the straps 32 and sealing members 66, 68. The reinforcing sections 57 provide support to the annular member 20 and prevent penetration, ballooning, or tearing in the sealing members 66, 68 by the straps 32. However, it in some applications, the reinforcing sections 57 are removed to allow lower insertion force of the coupling assembly 300.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTO-PRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Located on the underside of the end portions 352, 354 of the annular body 20 are lubrication segments 72, 74 that are in contact with respective pipe section 312, 314. The lubricated segments 72, 74 are attached to the annular body 20 by molding, extruding, bonding, painting, spraying, impregnating, or any other known form of attachment of lubrication to an elastomeric, thermoplastic, polymeric, or rubber material. Further, the lubrication segments 72, 74 are formed from any known lubricants, including, but not limited to, polyethylene, polypropylene, polytetrafluoroethylene (TEFLON®), graphite powder/molybdenum disulfide, and silicone.

In one exemplary embodiment, the lubrication segments 72, 74 are molded or extruded into the annular body 20 from a permanently lubricated film having a low coefficient-of-friction "COF" and more specifically, a COF level of point five (0.5) or less. An example of such suitable material for the lubricated film includes polyethylene or polypropylene, which has an approximate COF of point three (0.3). The lubricated segments 72, 74 are relatively thin, having a thickness range between 0.001" to 0.010" inches, preferably ranging between 0.003" to 0.005" inches. The lubricated segments 72, 74 may further include protrusions 99 or ribs 101 to further enhance the sealing connection formed therein.

During the manufacturing of the piping sections in for example, a plant or manufacturing facility, an operator can attach two pipe sections 312, 314 without the need for any special end configurations such as a hub typically required in conventional non-corrugated piping. Instead, the operator can use the coupling assembly 300 for attaching the ends of any two-pipe sections. In the illustrated example embodiment of FIG. 6, the annular body 20 is pushed onto the first pipe section 312 with the aid of lubrication segments 72, 74 until an end 313 of the pipe contacts a stop 308 of the flexing section 306 over the void 18 in a pressure enhancing orientation. Once the coupling assembly 300 covering the first pipe section 312 is in place, the second pipe section 314 is inserted into the annular body 20 with the aid of lubrication segments 72, 74 until an end 315 of the pipe contacts the second side of the stop 308 of the flexing section 306 over the void 18 in a pressure enhancing orientation. Body clamping structures 26 and 28 are then positioned over respective sealing members 66, 68 and tightened until achieving a secure fluid-tight seal.

In the field, upon discovering a leak, a contractor can cut along the leak of any piece of non-corrugated pipe at any location to form first and second pipe sections 312, 314 by using a saw, portable router, or knife. The pipe coupling assembly 300 is assembled over the pipe sections 312, 314 in a similar fashion as the method described above for assembly in a manufacturing facility or plant. However, in the field, the advantages of the flexible section 306 become more pronounced in assisting aligning the pipe sections where precise alignment is difficult, because of the piping being partially buried in the ground or in a wall of a house or commercial building.

The construct of the pipe coupling assembly 300 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 300 is not limited to any particular size and could span several inches or even feet to adjoin separated pipe sections. In one embodiment, the pipe coupling assembly 300 has a diameter ranging from one (1") inch to sixty (60") inches that attach corresponding diameters in first and second pipe sections, 12 and 14, respectively. In the pipe coupling assembly 200 having a smaller scale of twelve (12") inches in diameter or less, for example, is suitable for residential and commercial applications.

FIG. 7 is a partial sectional-side view of a pipe coupling assembly 400 constructed in accordance with another embodiment of the disclosure forming a fluid-tight sealing connection between two non-corrugated pipe sections, namely first section 412 and second section 414. The pipe coupling assembly 400 of FIG. 7 is designed to connect sections of piping during fabrication at manufacturing facilities, during installation of the pipe at its designated site, or to repair broken or leaking connections in the field.

The pipe coupling assembly 400 of FIG. 7 provides a fluid-tight connection between first 412 and second 414 pipe sections over a void 18 therebetween. The void 18 represents the space between the pipes sections that can range from several inches to a hairline break or fracture in either one of the pipe sections 412, 414. The pipe coupling assembly 400 advantageously adapts non-corrugated pipe sections 412 and 414 together without having special geometrical constructions at the pipe section ends, such as a hub-type connection end. Such examples of non-corrugated pipe sections include, but are not limited to, polyvinyl chloride ("PVC"), cast iron, black piping and the like. Advantageously, the pipe coupling assembly 400 provides the flexibility of attaching two sections of piping or the ability to seal a leak in an existing pipe at any location along the pipe.

The pipe coupling assembly 400 includes an annular body 20 formed of a unitary, tubular configuration that is circumferentially positioned around first and second pipe sections 412, 414. Alternatively, for repairing a leak, the annular body 20 is circumferentially positioned around a single pipe section 412 or 414, or two pipe sections formed from a single pipe section. The unitary tubular configuration can be formed by welding opposite ends of the annular body 20 together.

The pipe coupling assembly 400 further comprises body clamping structures 26 and 28 positioned between first and second locating bosses 29, 31. In one embodiment, the body clamping structures 26 and 28 comprise an attachment assembly 30, as illustrated in FIG. 5. While the attachment assembly 30 illustrates one embodiment for securing the strap 32 over the annular body 20, other types of clamps, such as tie wraps, hose clamps, lever or toggle clamps, and the like, could also be used without departing from the spirit and scope of the claimed invention. Further, the attachment assembly 30 in the exemplary embodiment of FIG. 7 is composed of nylon, but could also be made from steel, fiberglass, or plastic.

The annular body 20 in the exemplary embodiment of FIG. 7 comprises a plurality of elastomeric materials unitarily formed by extruding or molding operations. The unitary annular body 20 comprises medial section 56 and end portions 452, 454 having a durometer ranging between 40-50 on a Shore D scale. It is noted that any material having such relative hardness and flexibility capable of handling the water pressure to prevent stretching or ballooning of the medial section 56 and end portions 60, 62 can be used, and examples of suitable materials include High Density Polyethylene ("HDPE") plastic and rigid polypropylene plastic. The medial section 56 and end portions 452, 454 help hold the shape of the annular body 20 over the piping sections 412, 414 with relatively little deformation. The end portions 452 and 454 further provide a flanged opening ("A") that allows for guided installation of the coupling assembly 400 over the ends of respective pipe sections 412, 414.

The annular body 20 further comprises first and second annular sealing members 66 and 68, respectively. The annular sealing members 66, 68 are made from a relatively lower durometer (ranging between approximately 40 to 60 on a Shore A scale) to form a pliable fluid-tight seal with the respective pipe sections 412 and 414 or over a leak in a single pipe section. Facilitating the pliable fluid-tight seal are lobes 70 projecting from the sealing members 66, 68 toward the void 18, producing a pressure enhancing seal. The lobes 70 are in contact with the respective pipe section 412, 414 and further deform upon the tightening of the circular straps 32. Reinforcing sections 57 ranging between 0.002" to 0.005" of an inch in thickness extend from the medial section 56 of the 40-50 Shore D material to the end portions 452, 454 and between the straps 32 and sealing members 66, 68. The reinforcing sections 57 provide support to the annular member 20 and prevent penetration, ballooning, or tearing in the sealing members 66, 68 by the straps 32. However, it in some applications, the reinforcing sections 57 are removed to allow lower insertion force of the coupling assembly 400.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Located on the underside of the end portions 452, 454 of the annular body 20 are lubrication segments 72, 74 that are in contact with respective pipe section 412, 414. The lubricated segments 72, 74 are attached to the annular body 20 by molding, extruding, bonding, painting, spraying, impregnating, or any other known form of attachment of lubrication to an elastomeric, thermoplastic, polymeric, or rubber material. Further, the lubrication segments 72, 74 are formed from any known lubricants, including, but not limited to, polyethylene, polypropylene, polytetrafluoroethylene (TEFLON®), graphite powder/molybdenum disulfide, and silicone.

In one exemplary embodiment, the lubrication segments 72, 74 are molded or extruded into the annular body 20 from a permanently lubricated film having a low coefficient-of-friction "COF" and more specifically, a COF level of point five (0.5) or less. An example of such suitable material for the lubricated film includes polyethylene or polypropylene, which has an approximate COF of point three (0.3). The lubricated segments 72, 74 are relatively thin, having a thickness range between 0.001" to 0.010" inches, preferably ranging between 0.003" to 0.005" inches. The lubricated segments 72, 74 may further include protrusions 99 or ribs 101 to further enhance the sealing connection formed therein.

During the manufacturing of the piping sections in for example, a plant or manufacturing facility, an operator can attach two pipe sections 412, 414 without the need for any special end configurations such as a hub typically required in conventional non-corrugated piping. Instead, the operator can use the coupling assembly 400 for attaching the ends of any two-pipe sections. In the illustrated example embodiment of FIG. 7, the annular body 20 is pushed onto the first pipe section 412 with the aid of lubrication segments 72, 74 until an end 413 of the pipe contacts a stop 408 of the medial section 56 over the void 18 in a pressure enhancing orientation. Once the coupling assembly 400 covering the first pipe section 412 is in place, the second pipe section 414 is inserted into the annular body 20 with the aid of lubrication segments 72, 74 until an end 415 of the pipe contacts the second side of the stop 408 of the medial section 56 over the void 18 in a pressure enhancing orientation. Body clamping structures 26 and 28 are then positioned over respective sealing members 66, 68 and tightened until achieving a secure fluid-tight seal.

In the field, upon discovering a leak, a contractor can cut along the leak of any piece of non-corrugated pipe at any location to form first and second pipe sections 412, 414 by using a saw, portable router, or knife. The pipe coupling assembly 400 is assembled over the pipe sections 412, 414 in a similar fashion as the method described above for assembly in a manufacturing facility or plant.

The construct of the pipe coupling assembly 400 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 400 is not limited to any particular size and could span several inches or even feet to adjoin separated pipe sections. In one embodiment, the pipe coupling assembly 400 has a diameter ranging from one (1") inch to sixty (60") inches that attach corresponding diameters in first and second pipe sections, 12 and 14, respectively. In the pipe coupling assembly 400 having a smaller scale of twelve (12") inches in diameter or less, for example, is suitable for residential and commercial applications.

Figure 8:
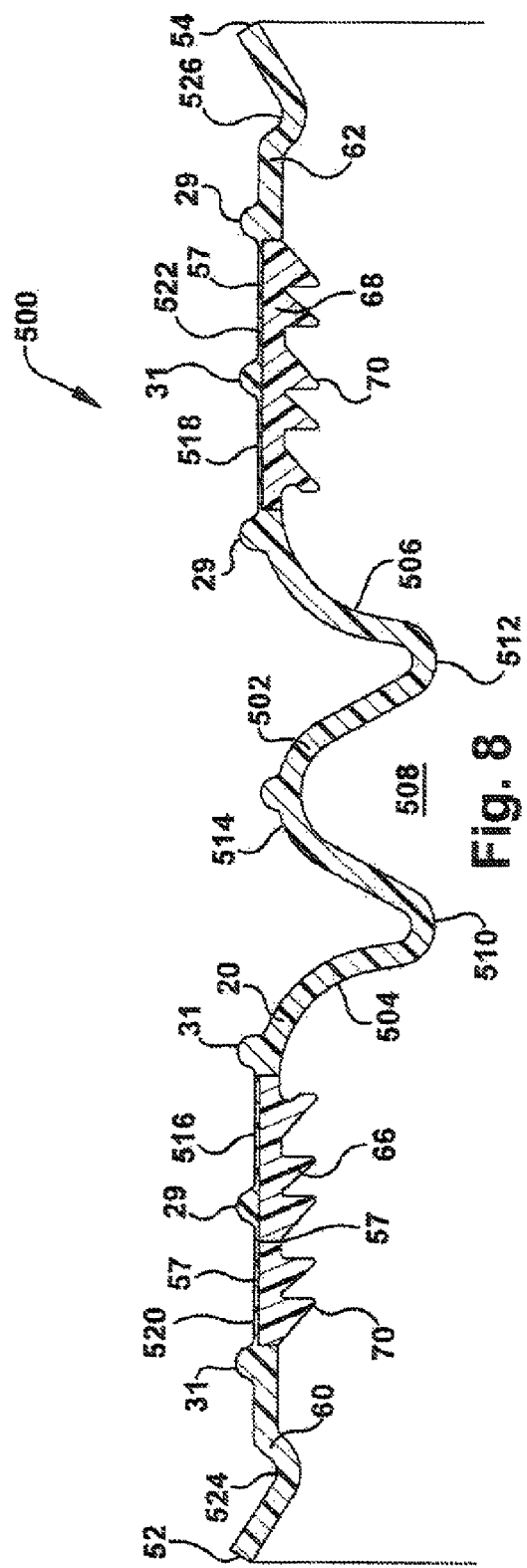
FIG. 8 is a partial sectional-side view of a pipe coupling assembly constructed in accordance with another embodiment of the present disclosure.
Figure 9:
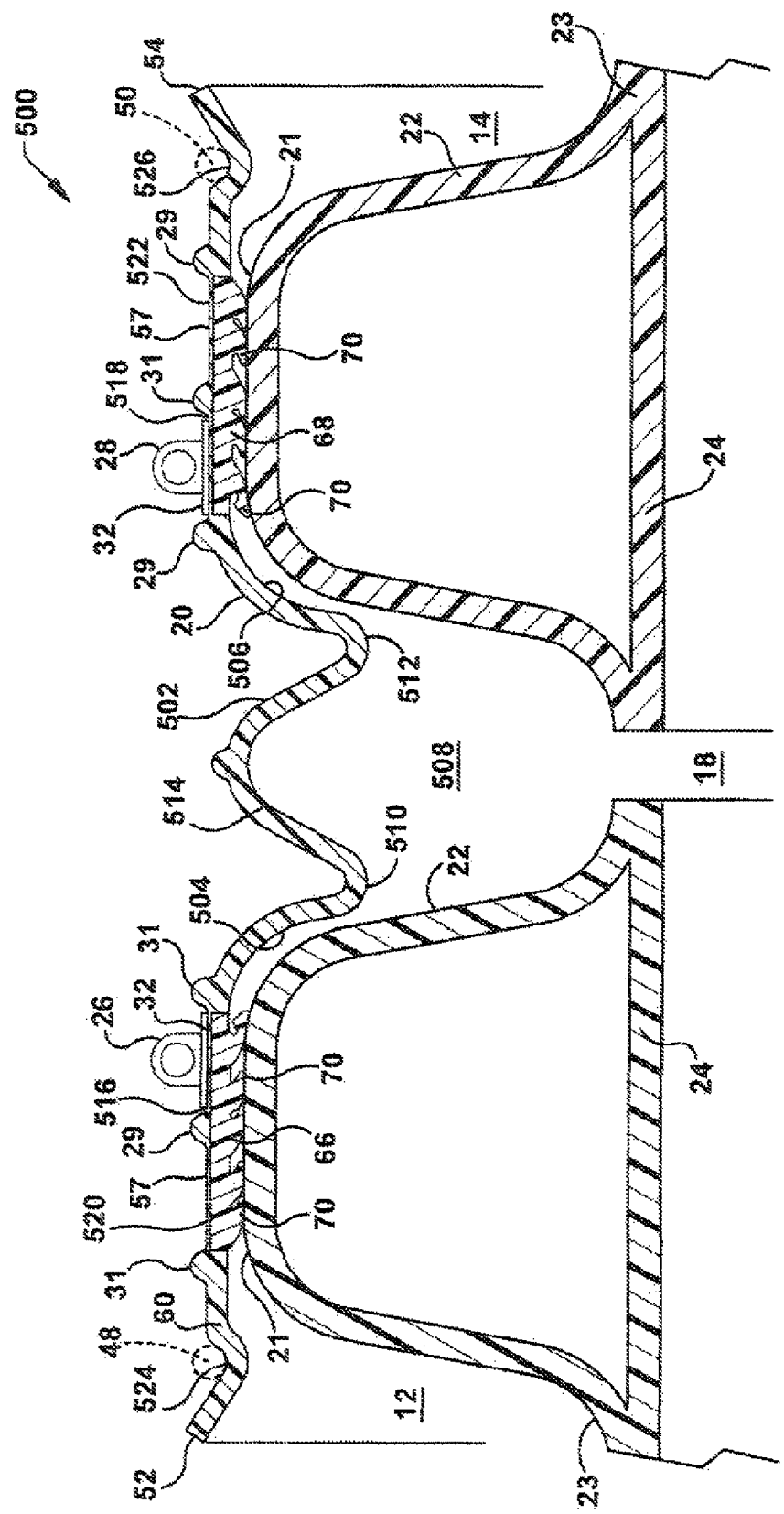
FIG. 9 is a partial sectional-side view of a pipe coupling assembly constructed in accordance with the embodiment of FIG. 8 forming a fluid-tight sealing connection between two corrugated pipe sections or over an opening in a pipe.

FIG. 8 illustrates a partial sectional-side view of an example embodiment of an annular pipe coupling assembly 500, the pipe coupling assembly provides a fluid-tight connection between first 12 and second 14 pipe sections over a void 18 therebetween, as illustrated in FIG. 9. The void 18 represents the space between the pipes sections that can range from several inches to a hairline break or fractures in either one of the pipe sections 12 or 14 or between adjoining pipe sections. The pipe coupling assembly 500 advantageously adapts first and second pipe sections 12, 14 together without having special geometrical constructions at the pipe section ends, such as bell and spigot configurations typically required in conventional piping connections. Accordingly, the pipe coupling assembly 500 reduces the expense and cost associated with forming special end configurations required or special sealing gaskets for connecting conventional corrugated piping sections. Further, the pipe coupling assembly 500 advantageously provides the flexibility of attaching two sections of piping or sealing a leak or leaks in an existing pipe at any location along the pipe. Yet another advantage provided by the coupling assembly 500 is its ability to connect any length of pipe, eliminating the need for standard pipe lengths having specialized end connections, such as bells and spigots.

The annular body 20 in the exemplary embodiment of FIGS. 8 and 9 comprises a plurality of elastomeric materials unitarily formed by extruding or molding operations. The unitary annular body 20 comprises an undulating medial section 502 that also includes arcuate stops 504 and 506 along the inner portion of the annular body that facilitate the positioning of the coupling assembly 500 against or near the crests 21 of the corrugations 22 during installation (see FIG. 9). In particular, the stops 504, 506 are constructed to form an inner region 508 comprising inner lobes 510 and 512 of the undulating medial section 502. The stops 504, 506 may contact the corrugation 22 during assembly as an indicator to the user that the coupling is properly seated. The addition of the stops 502, 506 prevent the coupling assembly 500 from over traveling during installation by contacting a portion of the crest 21 of the corrugation 22 once a sufficient amount of insertion is achieved. However, it should be noted and as shown in FIG. 9, a fluid tight seal is still achieved even if the stops 504, 506 do not contact the corrugation 22. The undulating medial section 502 further comprises a riser 514 that provides strength to the overall annular pipe coupling assembly 500 when welded in forming its annular shape. In particular, the riser 514 in combination with the inner lobes 510 and 512 prevent kinking or stresses in the coupling when assembled. The geometrical profile of the undulating medial section 502 also provides strength to the overall coupling assembly while allowing added flexibility between first 52 and second 54 ends of the annular body during assembly onto the pipe or pipes, 12, 14.

Located laterally to the undulating medial section 502 and stops 504, 506 are and end portions 60, 62. The undulating medial section 502, stops 504, 506 and end portions 60, 62 in the illustrated embodiment have a durometer ranging between 35-50 on a Shore D scale and preferably a Shore D value of approximately 40. The material thickness in the sectional view shown in FIGS. 8-9 for the undulating medial section 502, stops 504, 506, and end portions 60, 62 range between approximately 1/16" and 1/4" inches and are preferably 1/8" inches thick for smaller diameter applications, for example 12" inches or less and preferably 3/16" inch thick for larger diameter applications.

It is noted that any material having such relative hardness and flexibility capable of handling the water pressure to prevent stretching or ballooning of the undulating medial section 502 and end portions 60, 62 can be used, and examples of suitable materials include High Density Polyethylene ("HDPE") and rigid polypropylene plastic. The undulating medial section 502, stops 504, 506, and end portions 60, 62 help hold the shape of the annular body 20 over the piping sections 12, 14 with relatively little radial deformation. In contrast, the undulating medial section 502 allows for lateral deformation and permits hinge-like motion in the annular body in order to accommodate misalignment between the pipe sections 12, 14 and ease of assembly, including, installing the coupling assembly 500 during repairs in the field or over a leak in a single pipe section.

The pipe coupling assembly 500 further comprises body clamping structures 26 and 28 positioned within securing stations 516 and 518 between first and second locating bosses 29, 31. In one embodiment, the body clamping structures 26 and 28 comprise an attachment assembly 30, as illustrated in FIG. 5. The attachment assembly 30 includes a circular strap 32 for securing the annular body 20 over the respective pipe sections 12, 14, during installation by locking together first and second ends 32a and 32b, respectively. While the attachment assembly 30 illustrates one embodiment for securing straps 32 over the annular body 20, other types of clamps, such as tie wraps, hose clamps, lever or toggle clamps, and the like, could also be used without departing from the spirit and scope of the claimed invention. Further, the clamping structures 26 and 28 in the exemplary embodiment of FIG. 9 are composed of steel, but could also be made from nylon, fiberglass, or plastic.

In addition to the security provided by the clamping structures 26 and 28 to the annular body 20, additional securing stations 520 and 522 are provided for high pressure applications. The plurality of securing stations 516-522 that surround the coupler 500 also provide flexibility in locating the clamping structures based on variations in the corrugations 22 size. Additional security is available to coupling 500 through circular locking clamps 48, 50 that are provided (see FIG. 9 in phantom) for securing first 52 and second 54 ends of the annular body 20 over the crest 21 of the transverse corrugations 22 into the valleys 23 by placing locking clamps in troughs 524, 526. The circular locking clamps 48, 50 are adjusted and tightened in a similar fashion as the clamping structures associated with FIG. 5, or any other known clamping structures. Suitable examples include, but are not limited to, tie wraps, hose clamps, lever or toggle clamps, and turnbuckle clamps. The troughs 51 hold the locking clamps in position when secured. The locking clamps 48, 50 can be used in high pressure or in applications with heightened code requirements.

The unitary tubular configuration can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009, which has been incorporated herein by reference in its entirety.

The annular body 20 further comprises first and second annular sealing members 66 and 68, respectively. The annular sealing members 66, 68 are made from a relatively lower durometer material (ranging between approximately 40 to 60 on a Shore A scale) to form a pliable fluid-tight seal with the respective sections of pipe 12 or pipe sections 12 and 14. Facilitating the pliable fluid-tight seal are lobes 70 projecting from the sealing members 66, 68 toward the void 18, producing a pressure enhancing seal. The lobes 70 are in contact with the crest 21 of respective sections of pipes 12, 14 and further deform upon the tightening of the circular straps 32 and/or locking clamps 48, 50.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Reinforcing sections 57 ranging between 0.002" to 0.005" of an inch in thickness are formed with the 35-50 Shore D material and extend from the medial section 502 and the end portions 60, 62 and form the securing sections 516-522 covering the sealing members 66, 68. The reinforcing sections 57 provide support to the annular member 20 and prevent penetration, ballooning, or tearing in the sealing members 66, 68 by the straps 32. The reinforcing sections 57 also provide enough rigidity to allow clamping structures to be used without tearing the softer material used in the sealing members 66 and 68.

In another example embodiment, the reinforcing sections 57 thicknesses range between 0.010 and 0.040 inches, and preferably 0.030 inches. The additional thickness of the reinforcing structure in addition to the dimensional stack-up of piping sections 12 and 14 produce enough pressure during assembly to eliminate the need for clamping structures or locking clamps. This may be particularly desirable in low pressure applications.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 500 for attaching the ends of any two-pipe sections. In the illustrated example embodiment of FIG. 9, the annular body 20 is pushed onto the first pipe section 12 that traverses the crest 21 until the stop 504 is engaged by or in close proximity with the transverse corrugation section 22, forcing the lobes 70 of the annular sealing member 66 toward the void 18 in a pressure enhancing orientation. Once the first section of pipe 12 is in place, the second section of pipe 14 is inserted into the annular body 20 until the stop 506 is engaged by or in close proximity with the transverse corrugation section 22, forcing the lobes 70 of the annular sealing member 68 toward the void 18 in a pressure enhancing orientation against respective crests 21. Body clamping structures 26 and 28 are then positioned over respective sealing members 66, 68 in first sets of securing structures 516-518 or 520-522 or both, depending on the size of the corrugation and/or pressure requirements. In higher pressure situations or in applications having heightened code requirements, clamping structures 48 and 50 can be used. The locking clamps 48, 50 may further facilitate in forming the fluid-tight seal of the pipe coupling assembly 500.

In the field, upon discovering a leak, a contractor can cut along the leak of any piece of corrugated pipe at any location to form first and second pipe sections 12, 14 of FIG. 9 by using a saw, portable router, or knife. The pipe coupling assembly 500 is assembled over the pipe sections 12, 14 in a similar fashion as the method described above for assembly in a manufacturing facility or plant.

The construct of the pipe coupling assembly 500 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 500 is not limited to any particular size and could span several inches or even feet to adjoin separated pipe sections. In one embodiment, the pipe coupling assembly 500 has a diameter ranging from one (1") inch to sixty (60") inches that attach corresponding diameters in first and second pipe sections, 12 and 14, respectively. The pipe coupling assembly 500 having a relatively smaller scale of twelve (12") inches in diameter or less, for example, is suitable for residential and commercial applications. Further, in one embodiment, the annular body 20 covers several transverse sections 22 on each side before encountering the void 18 or leak in the piping section.

Figure 10:
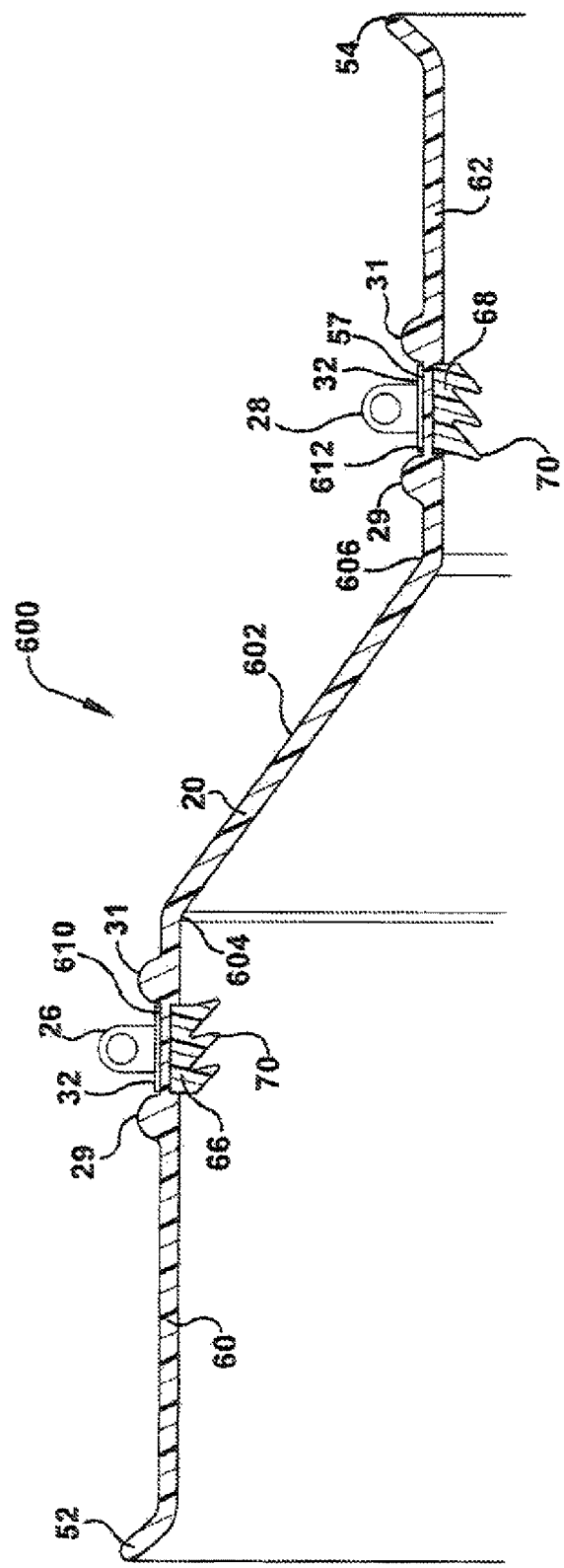
FIG. 10 is a partial sectional-side view of a pipe coupling assembly constructed in accordance with another embodiment of the present disclosure.

FIG. 10 illustrates a partial sectional-side view of an example embodiment of an annular pipe coupling assembly 600 that provides a fluid-tight connection between two sections of varying diameter. The pipe coupling assembly 600 advantageously adapts two pipe sections together without having special geometrical constructions at the pipe section ends, such as bell and spigot The annular body 20 in the exemplary embodiment of the pipe coupling assembly 600 comprises a plurality of elastomeric materials unitarily formed by extruding or molding operations. In one embodiment, the annular pipe coupling assembly is formed from a two-shot molding process, having a first durometer material molded to a second and different durometer material. The unitary annular body 20 comprises an tapered medial section 602 that converges from a larger diameter opening at first end 52 to a smaller diameter opening 54 at second end 54 to accommodate different size pipe diameters Located laterally to the tapered medial section 602 lateral extensions 604 and 606 that extend to end portions 60, 62. The tapered medial section 602 and end portions 60, 62 in the illustrated embodiment have a durometer ranging between 35-50 on a Shore D scale and preferably a Shore D value of approximately 40. It is noted that any material having such relative hardness and flexibility capable of handling the water pressure to prevent stretching or ballooning of the tapered medial section 602 and end portions 60, 62 can be used, and examples of suitable materials include High Density Polyethylene ("HDPE") and rigid polypropylene plastic.

The pipe coupling assembly 600 further comprises body clamping structures 26 and 28 positioned within securing stations 610 and 612 between first and second locating bosses 29, 31. In one embodiment, the body clamping structures 26 and 28 comprise an attachment assembly 30, as illustrated in FIG. 5. The attachment assembly 30 includes a circular strap 32 for securing the annular body 20 over the respective pipe sections 12, 14, during installation by locking together first and second ends 32a and 32b, respectively. While the attachment assembly 30 illustrates one embodiment for securing straps 32 over the annular body 20, other types of clamps, such as tie wraps, hose clamps, lever or toggle clamps, and the like, could also be used without departing from the spirit and scope of the claimed invention. Further, the clamping structures 26 and 28 in the exemplary embodiment of FIG. 10 are composed of steel, but could also be made from nylon, fiberglass, or plastic.

The unitary tubular configuration is formed by molding. However, the unitary tubular configuration if extruded can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009, which has been incorporated herein by reference in its entirety.

The annular body 20 further comprises first and second annular sealing members 66 and 68, respectively. The annular sealing members 66, 68 are made from a relatively lower durometer material (ranging between approximately 40 to 60 on a Shore A scale) to form a pliable fluid-tight seal with the respective sections of varying diameter pipe sections. Facilitating the pliable fluid-tight seal are lobes 70 projecting from the sealing members 66, 68 toward the tapered medial section 602 that when assembled would cover two pipe sections of different diameters, producing a pressure enhancing seal. The lobes 70 during assembly would contact diameters of each respective pipe section and further deform upon the tightening of the circular straps 32.

An example of a suitable material for the sealing members 66, 68 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Reinforcing sections 57 ranging between 0.002" to 0.005" of an inch in thickness are formed with the 35-50 Shore D material and extend from the tapered medial section 602 and the end portions 60, 62 and form the securing sections 610, 612, covering the sealing members 66, 68. The reinforcing sections 57 provide support to the annular member 20 and prevent penetration, ballooning, or tearing in the sealing members 66, 68 by the straps 32. The reinforcing sections 57 also provide enough rigidity to allow clamping structures to be used without tearing the softer material used in the sealing members 66 and 68.

In another example embodiment, the reinforcing sections 57 thicknesses range between 0.010 and 0.040 inches, and preferably 0.030 inches. The additional thickness of the reinforcing structure in addition to the dimensional stack-up of the varying diameter piping sections produce enough pressure during assembly to eliminate the need for clamping structures or locking clamps. This may be particularly desirable in low pressure applications.

The construct of the pipe coupling assembly 600 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 600 is not limited to any particular size and could span several inches or even feet to adjoin separated and varying pipe diameter sections. In one embodiment, the pipe coupling assembly 600 has varying diameters between the pipe sections ranging from one (1") inch to sixty (60") inches.

Figure 11:
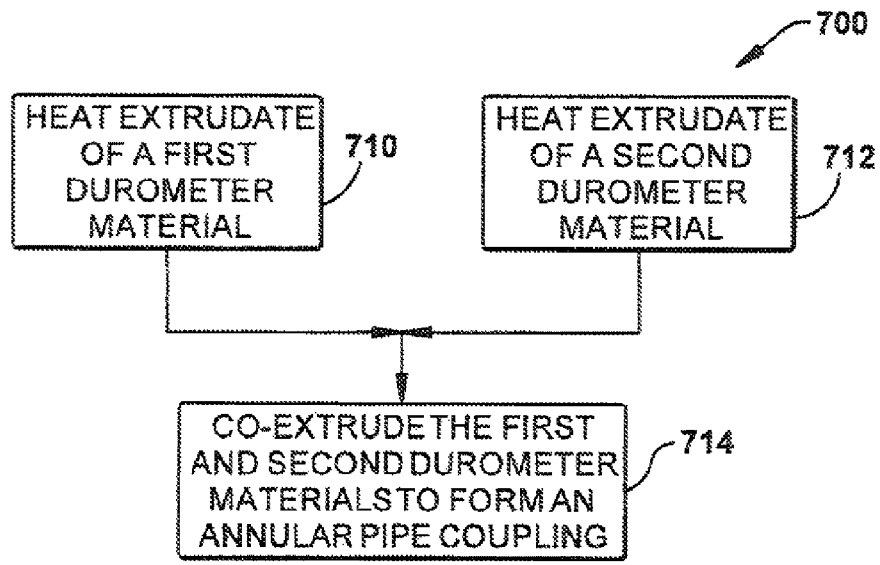
FIG. 11 is a method of forming a pipe coupling assembly in accordance with one embodiment of the present disclosure.

Illustrated in FIG. 11 is a process 700 for forming an annular pipe coupling assembly that will create a fluid-tight connection between two sections of piping or over a leak in a single section of piping. At 710, an extrudate of a first durometer material is heated. At 712, an extrudate of a second durometer material is heated. At 714, the first and second durometer materials are co-extruded through a die head to form an annular pipe coupling embodied in the present disclosure.

Figure 12:
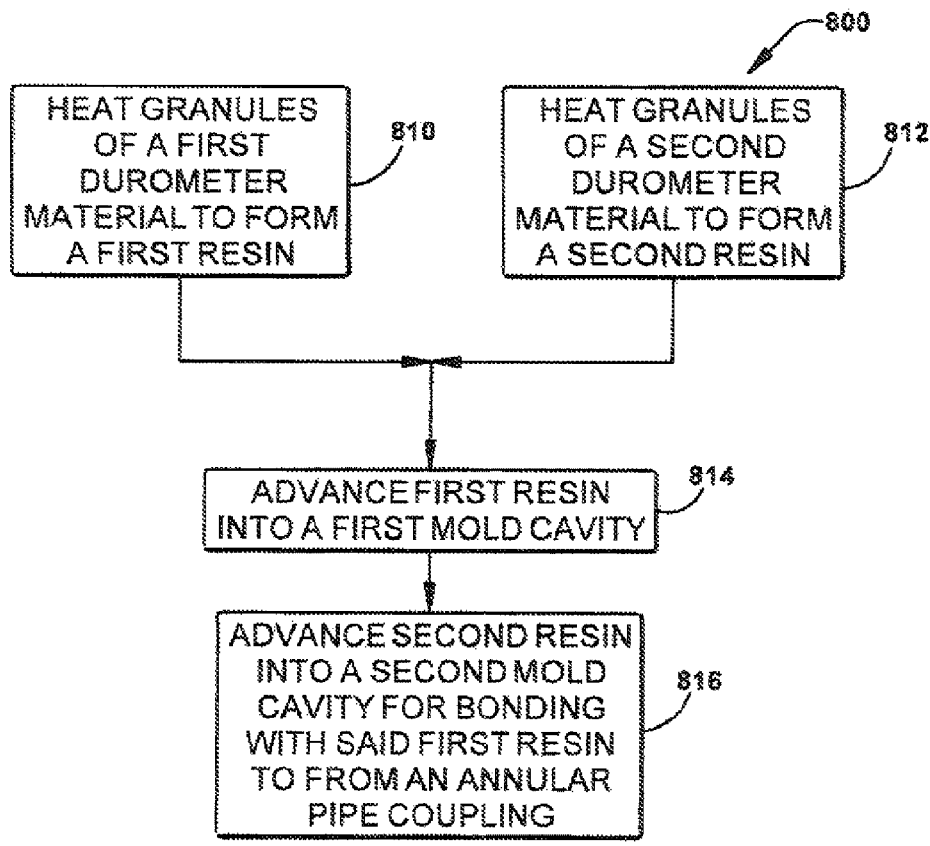
FIG. 12 is a method of forming a pipe coupling assembly in accordance with one embodiment of the present disclosure.

Illustrated in FIG. 12 is a process 800 for forming an annular pipe coupling assembly that will create a fluid-tight connection between two sections of piping or over a leak in a single section of piping. At 810, granules of a first durometer material are heated to form a first resin material. At 812, granules of a second durometer material are heated to form a second resin material. At 814, the first resin material is advanced into a first mold cavity. At 816, a second resin material is advanced into a second mold cavity for bonding with the first resin to form an annular pipe coupling embodied in the present disclosure.

FIGS. 13A and 13B illustrate another example embodiment of an annular pipe coupling assembly 900 that provides a fluid-tight connection between two sections of piping. In the illustrated embodiment of FIGS. 13A and 13B, the pipe coupling assembly is constructed and functions as a P-Trap for residential applications.

The annular body 20 in the exemplary embodiment of the pipe coupling assembly 900 comprises a plurality of elastomeric materials unitarily formed by extruding or molding operations. In the illustrated embodiment, the pipe coupling assembly 900 is preferably formed from a two-shot molding process, having a first durometer material molded to a second and different durometer material. The unitary annular body 20 comprises first and second radial portions, 902 and 904, respectively. The radial sections 902 and 904 extend to linear sections 906. Openings 908 are located at the ends of the linear sections 906 and are designed to form a fluid-tight connection between two pipes sections. In residential applications, the openings 908 may attach to pipe sections extending from a sink or wall.

FIG. 13B illustrates a cross-sectional view of one of two end assemblies 910 of the annular pipe coupling assembly 900. Each end assembly 910 includes an end portion 912 that extends from the opening 908 to reinforcing a reinforcing section 57. The reinforcing section 57 is integrally formed with the end portions 912 and annular body 20. The end portions 912, reinforcing sections, and body 20 have a durometer ranging between 35-50 on a Shore D scale and preferably a Shore D value of approximately 40. It is noted that any material having such relative hardness and flexibility capable of handling the water pressure to prevent stretching or ballooning of the body, reinforcing sections 57, and end portions 912 can be used, and examples of suitable materials include High Density Polyethylene ("HDPE") and rigid polypropylene plastic.

The pipe coupling assembly 900 further comprises body clamping structures 26 and 28 positioned within securing stations 914. In one embodiment, the body clamping structures 26 and 28 comprise an attachment assembly 30, as illustrated in FIG. 5. The attachment assembly 30 includes a circular strap 32 for securing the annular body 20 over the respective pipe sections (not shown) that engage the coupling assembly 900 during installation by locking together first and second ends 32*a* and 32*b*, respectively. While the attachment assembly 30 illustrates one embodiment for securing straps 32 over the annular body 20, other types of clamps, such as tie wraps, hose clamps, lever or toggle clamps, and the like, could also be used without departing from the spirit and scope of the claimed invention. Further, the clamping structures 26 and 28 in the exemplary embodiment of FIG. 13A are composed of steel, but could also be made from nylon, fiberglass, or plastic.

The annular body 20 further comprises annular sealing members 66 in each end assembly integrally formed with the reinforcing sections 57. The annular sealing members 66 are made from a relatively lower durometer material (ranging between approximately 40 to 60 on a Shore A scale) to form a pliable fluid-tight seal with the respective pipe sections.

Facilitating the pliable fluid-tight seal are lobes 70 projecting from the sealing members 66 toward the linear sections 906 that when assembled would cover two pipe sections, producing a pressure enhancing seal. The lobes 70 during assembly would contact diameters of each respective pipe section and further deform upon the tightening of the circular straps 32.

An example of a suitable material for the sealing members 66 includes ASTM F477 Low Head material (ASTM F477 LH), which has a durometer of 50 plus or minus five on a Shore A scale. One company that makes ASTM F477 LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Reinforcing sections 57 ranging between 0.002" to 0.005" of an inch in thickness and are formed with the 35-50 Shore D material that extends from the body 20 to the end portions 912. The reinforcing sections 57 cover the sealing members 66 and prevent penetration, ballooning, or tearing in the sealing members by the straps 32. The reinforcing sections 57 also provide enough rigidity to allow clamping structures to be used without tearing the softer material used in the sealing members 66 and 68.

The construct of the pipe coupling assembly 900 in addition to the strength and sealing advantages described also provides advantageously a design with reduced cost for manufacturing. That is, the more pliable and costly material found, for example in the sealing members 66 are molded or co-extruded only in the areas needed, as shown in the illustrated embodiments.

The overall length of the pipe coupling assembly 900 is not limited to any particular size and could span several inches or even feet to adjoin separated and varying pipe diameter sections. In one embodiment, the pipe coupling assembly 900 has varying diameters between the pipe sections ranging from one (1") inch to sixty (60") inches.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A coupler assembly for use with pipe comprising:
   a unitary annular body forming first and second cylindrical openings for surrounding a pipe or piping sections to facilitate forming a fluid-tight seal therein, the unitary annular body comprising a medial portion and first and second lateral portions integrally connected at opposite ends of said medial portion, the medial, and first and second lateral portions being made from a first material having a first durometer;
   annular sealing members integrally formed with the first and second lateral portions, the almular sealing members being made from a second material having a second durometer relatively lower than said first durometer of said first material for forming a fluid-tight seal around a pipe or between piping sections;
   a reinforcing section integrally formed in said first material in said first and second lateral portions, the reinforcing sections covering at least a portion of said annular sealing members; and
   clamping assemblies positioned on said reinforcing section for drawing said sealing members and reinforcing sections against a pipe or piping sections, wherein the clamping assemblies are radially aligned with the annular sealing members for radially compressing the annular sealing members.

2. The coupler assembly of claim 1, wherein the medial portion includes a flexing section made from a semi-flexible material having a durometer ranging between 50 and 80 on a Shore A scale.

3. The coupler assembly of claim 1, wherein the first durometer ranges between 40 and 50 on a Shore D scale and the second durometer ranges between 40 and 60 on a Shore A scale.

4. The coupler assembly of claim 1, wherein the medial portion extends radially inward of the first and second lateral portions relative to a central axis of the annular body to form a channel between the first and second lateral portions.

5. The coupler assembly of claim 4, wherein a pair of spaced-apart stops extends radially inward from the medial portion towards the central axis of the annular body to form the channel.

6. The coupler assembly of claim 5, wherein both stops are arcuate.

7. The coupler assembly of claim 1, wherein the reinforcing sections are arcuate prior to the clamping assemblies being positioned thereon.

8. The coupler assembly of claim 7, wherein the reinforcing sections form convex humps prior to the clamping assemblies being positioned thereon.

9. The coupler assembly of claim 1, wherein the annular body extends longitudinally from a first end to a second end, each of the first and second ends being angled relative to the medial portion.

10. The coupler assembly of claim 1, wherein the reinforcing section is coplanar with the medial portion of the body.

11. A coupler assembly for use with pipe comprising:
    a unitary annular body forming first and second cylindrical openings for surrounding a pipe or piping sections to facilitate forming a fluid-tight seal therein, the unitary annular body comprising a medial portion and first and second lateral portions integrally connected at opposite ends of said medial portion, the medial, and first and second lateral portions being made from a first material having a first durometer;
    annular sealing members facing radially inward of said annular body and integrally fanned with the first and second lateral portions, the annular sealing members being made from a second material having a second durometer relatively lower than said first durometer of said first material for forming a fluid-tight seal around a pipe or between piping sections;
    a plurality of lobes extending from said annular sealing members, the plurality of lobes projecting away from said reinforcing section toward said medial portion for forming a fluid-tight sealing connection in a pipe or between piping sections such that insertion of a pipe into either of said first or second openings biases the contacting sealing members to a pressure enhancing seal;

a reinforcing section integrally formed in said first material in said first and second lateral portions, the reinforcing sections in the first and second lateral portions overlying at least a portion of said annular sealing members, the reinforcing sections having a reduced cross-sectional area relative to the cross-sectional area of first and second lateral portions surrounding said reinforcing section; and clamping assemblies positioned on said reinforcing section for drawing said sealing members and reinforcing sections against a pipe or piping sections, wherein the clamping assemblies are radially aligned with the annular sealing members for radially compressing the annular sealing members.

12. The coupler assembly of claim 11, wherein the medial portion includes a flexing section made from a semi-flexible material having a durometer ranging between 50 and 80 on a Shore A scale.

13. The coupler assembly of claim 11, wherein the first durometer ranges between 40 and 50 on a Shore D scale and the second durometer ranges between 40 and 60 on a Shore A scale.

14. The coupler assembly of claim 11, wherein the medial portion extends radially inward of the first and second lateral portions relative to a central axis of the annular body to form a channel between the first and second lateral portions.

15. The coupler assembly of claim 14, wherein a pair of spaced-apart stops extends radially inward from the medial portion towards the central axis of the annular body to form the channel.

16. The coupler assembly of claim 15, wherein both stops are arcuate.

17. The coupler assembly of claim 16, wherein the reinforcing sections form convex humps prior to the clamping assemblies being positioned thereon.

18. The coupler assembly of claim 11, wherein the reinforcing sections are arcuate prior to the clamping assemblies being positioned thereon.

19. The coupler assembly of claim 11, wherein the annular body extends longitudinally from a first end to a second end, each of the first and second ends being angled relative to the medial portion.

20. The coupler assembly of claim 11, wherein the reinforcing section is coplanar with the medial portion of the body.

21. A coupler assembly for use with pipe comprising:
a unitary annular body forming first and second cylindrical openings for surrounding a pipe or piping sections to facilitate forming a fluid-tight seal therein, the unitary annular body comprising a medial portion and first and second lateral portions integrally connected at opposite ends of said medial portion, the medial, and first and second lateral portions being made from a first material having a first durometer;
annular sealing members integrally formed with the first and second lateral portions, the annular sealing members being made from a second material having a second durometer relatively lower than said first durometer of said first material for forming a fluid-tight seal around a pipe or between piping sections;
a reinforcing section integrally formed in said first material in said first and second lateral portions, the reinforcing sections covering at least a portion of said annular sealing members, the reinforcing sections having a reduced cross-sectional area relative to the cross-sectional area of first and second lateral portions surrounding said reinforcing section; and
clamping assemblies positioned on said annular body for drawing said sealing members and reinforcing sections against a pipe or piping sections, wherein the clamping assemblies are radially aligned with the annular sealing members for radially compressing the annular sealing members.

22. The coupler assembly of claim 21, wherein the medial portion includes a flexing section made from a semi-flexible material having a durometer ranging between 50 and 80 on a Shore A scale.

23. The coupler assembly of claim 21, wherein the first durometer ranges between 40 and 50 on a Shore D scale and the second durometer ranges between 40 and 60 on a Shore A scale.

24. The coupler assembly of claim 21, wherein the medial portion extends radially inward of the first and second lateral portions relative to a central axis of the annular body to form a channel between the first and second lateral portions.

25. The coupler assembly of claim 24, wherein a pair of spaced-apart stops extends radially inward from the medial portion towards the central axis of the annular body to form the channel.

26. The coupler assembly of claim 25, wherein both stops are arcuate.

27. The coupler assembly of claim 21, wherein the reinforcing section is coplanar with the medial portion of the body.

28. A coupler assembly for use with pipe comprising:
a unitary annular body forming first and second cylindrical openings for surrounding a pipe or piping sections to facilitate forming a fluid-tight seal therein, the unitary annular body comprising a medial portion and first and second lateral portions integrally connected at opposite ends of said medial portion, the medial, and first and second lateral portions being made from a first material having a first durometer;
annular sealing members facing radially inward of said annular body and integrally fanned with the first and second lateral portions, the annular sealing members being made from a second material having a second durometer relatively lower than said first durometer of said first material for forming a fluid-tight seal around a pipe or between piping sections;
a reinforcing section integrally formed in said first material in said first and second lateral portions, the reinforcing sections in the first and second lateral portions overlying at least a portion of said annular sealing members, the reinforcing sections having a reduced cross-sectional area relative to the cross-sectional area of first and second lateral portions surrounding said reinforcing section; and
clamping assemblies positioned on said reinforcing section for drawing said sealing members and reinforcing sections against a pipe or piping sections, wherein the clamping assemblies are radially aligned with the annular sealing members for radially compressing the annular sealing members.

* * * * *